Oct. 22, 1935.     J. S. STOKES ET AL     2,018,237
BOX FORMING SYSTEM
Filed Feb. 28, 1933     17 Sheets-Sheet 1

INVENTORS
John S. Stokes and
Ernest G. Rider
BY Cornelius D. Ehret
their ATTORNEY.

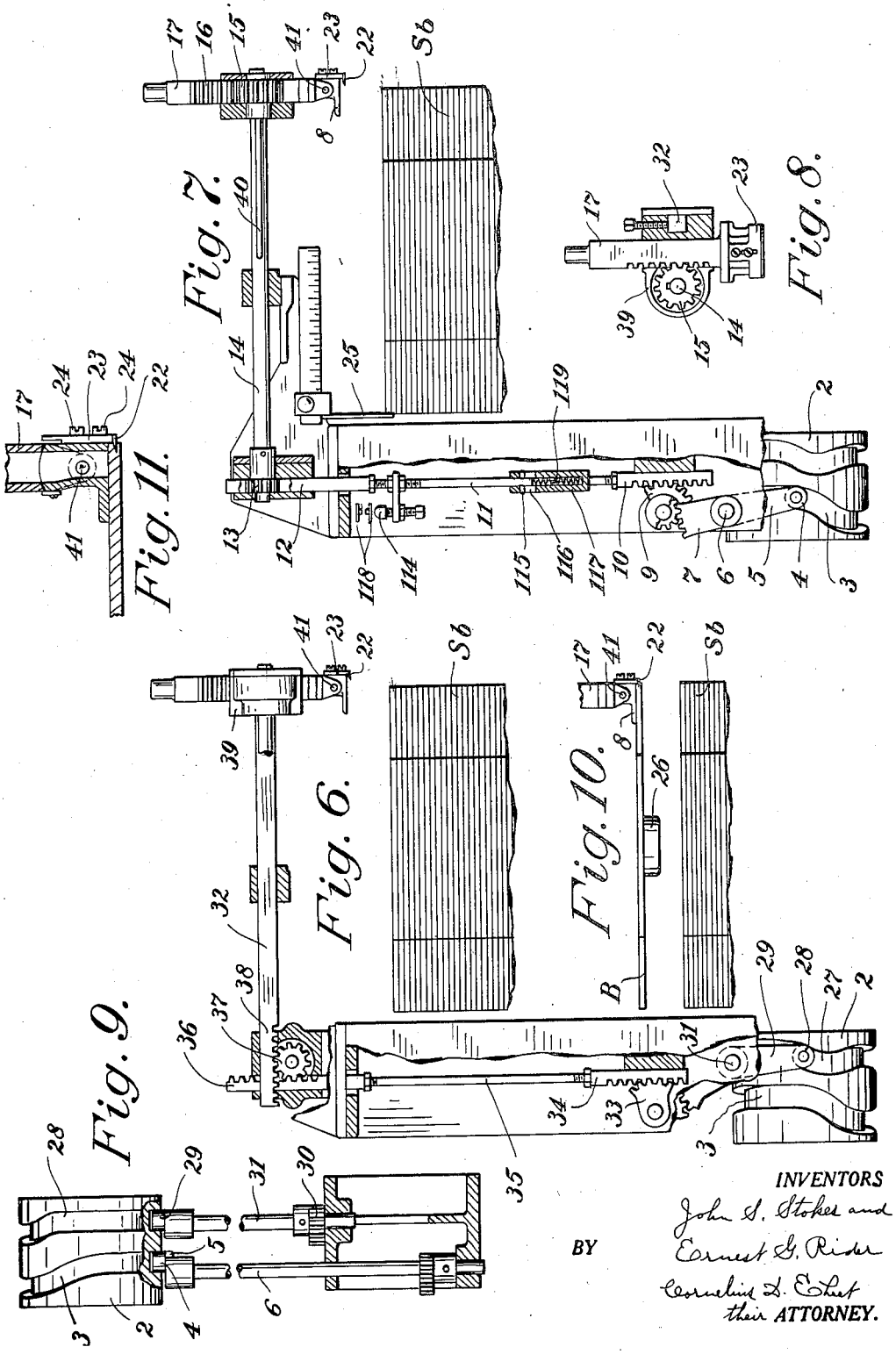

Oct. 22, 1935.   J. S. STOKES ET AL   2,018,237
BOX FORMING SYSTEM
Filed Feb. 28, 1933   17 Sheets-Sheet 5
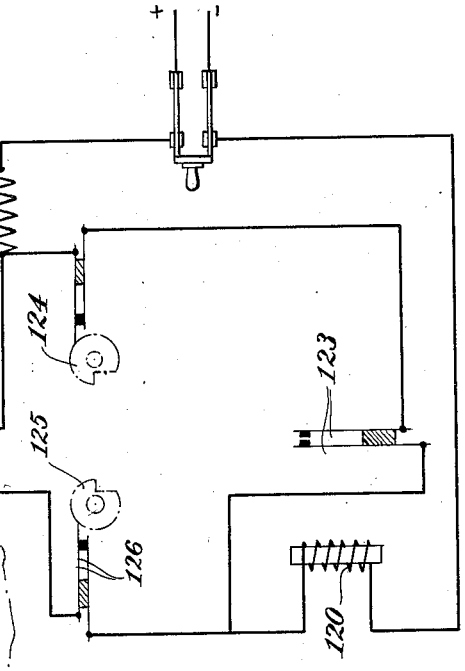
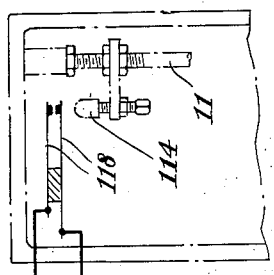
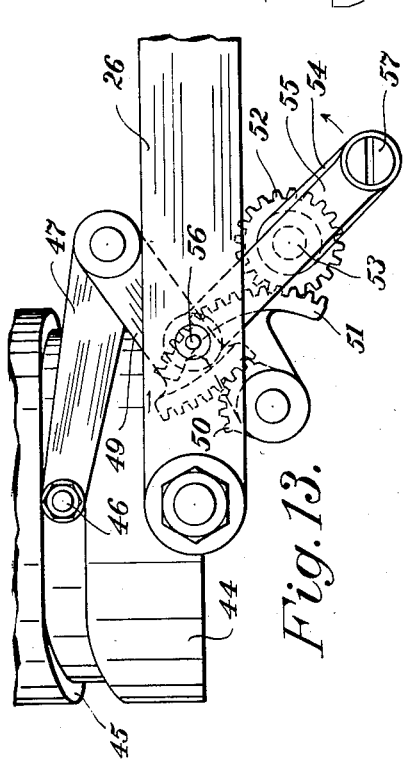
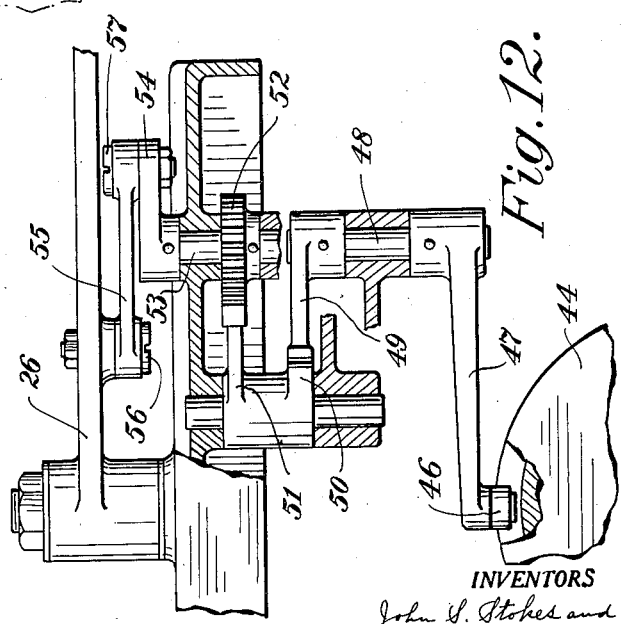
INVENTORS
John S. Stokes and
Ernest G. Rider
BY Cornelius D. Ehret
their ATTORNEY.

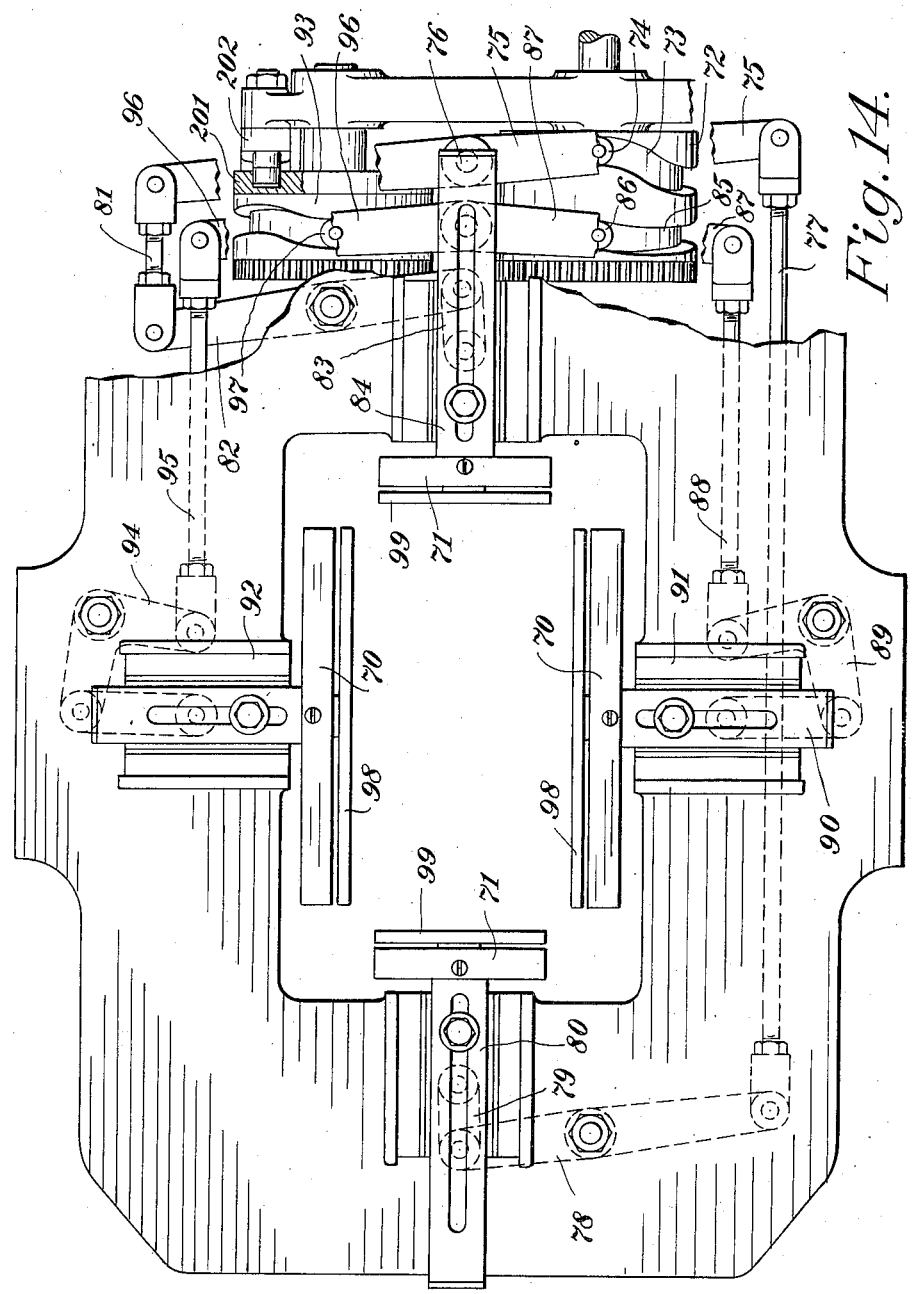

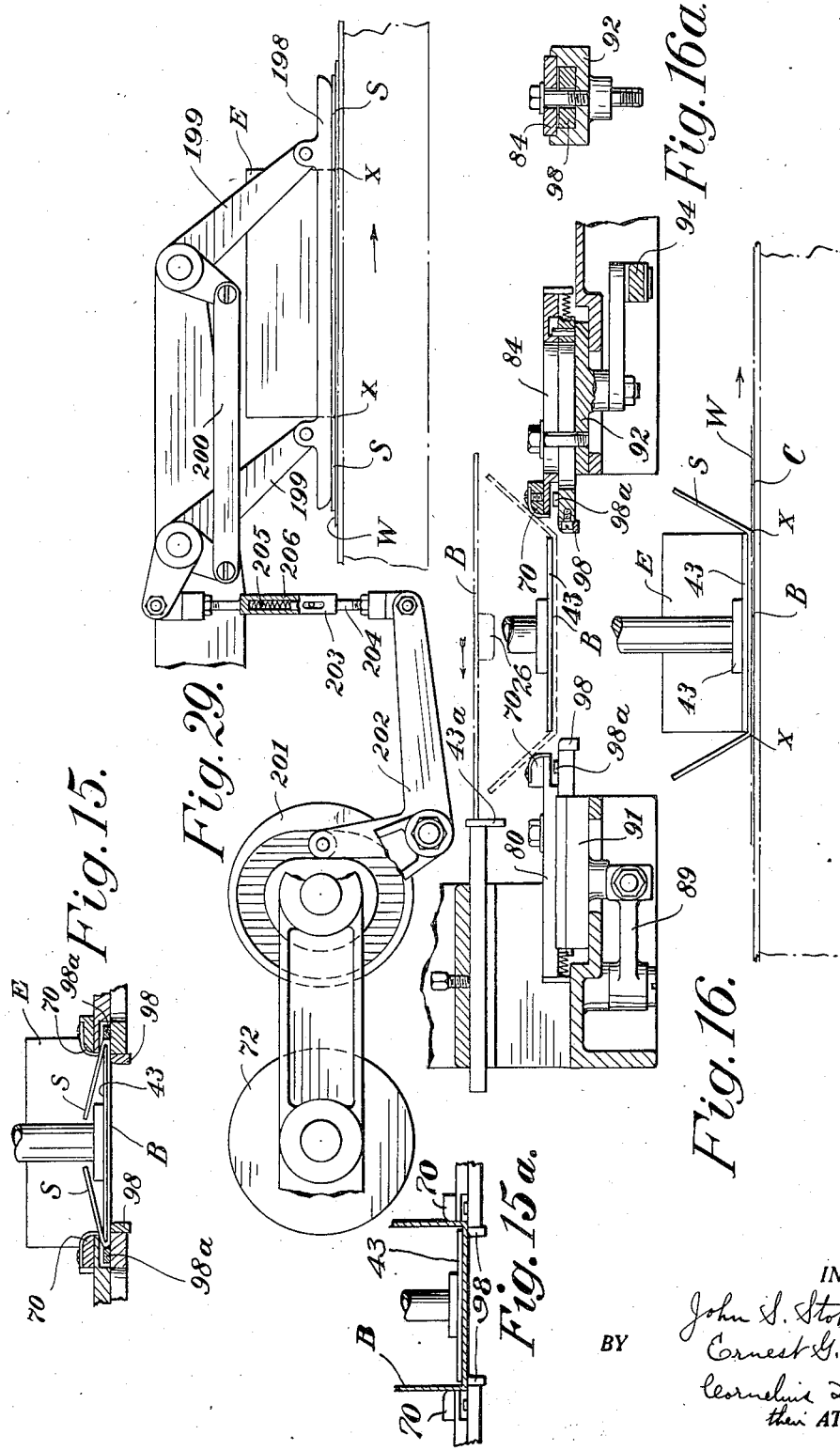

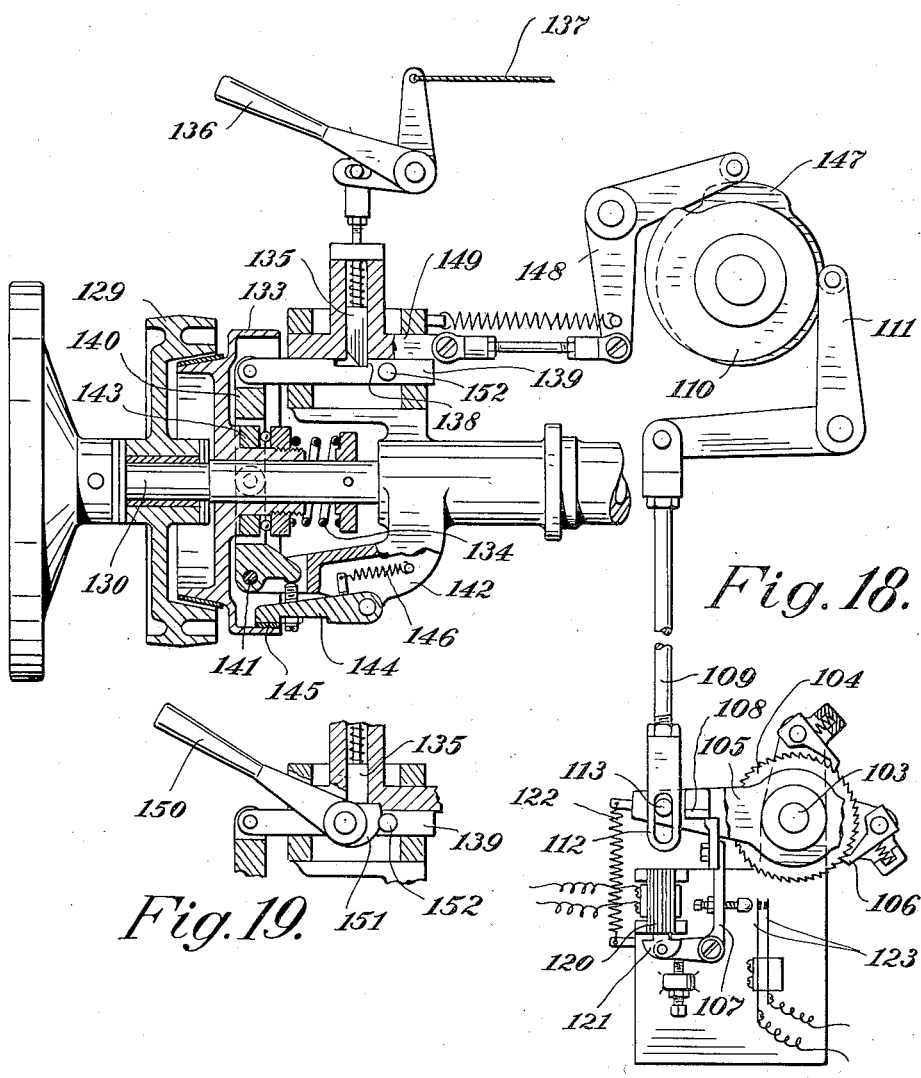

Oct. 22, 1935.   J. S. STOKES ET AL   2,018,237
BOX FORMING SYSTEM
Filed Feb. 28, 1933   17 Sheets-Sheet 9
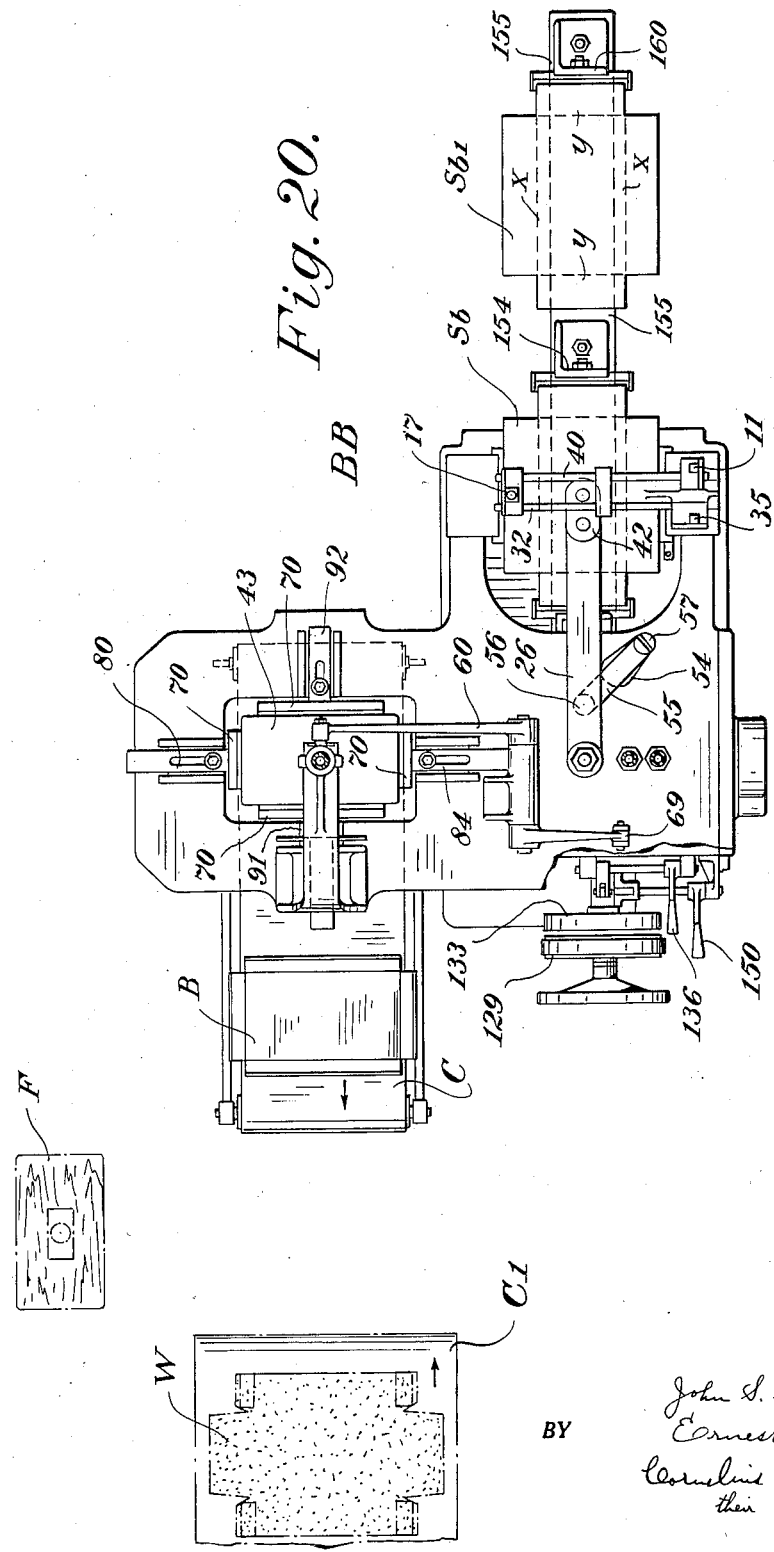
INVENTORS
John S. Stokes and
Ernest G. Rider
BY Cornelius D. Ehret
their ATTORNEY.

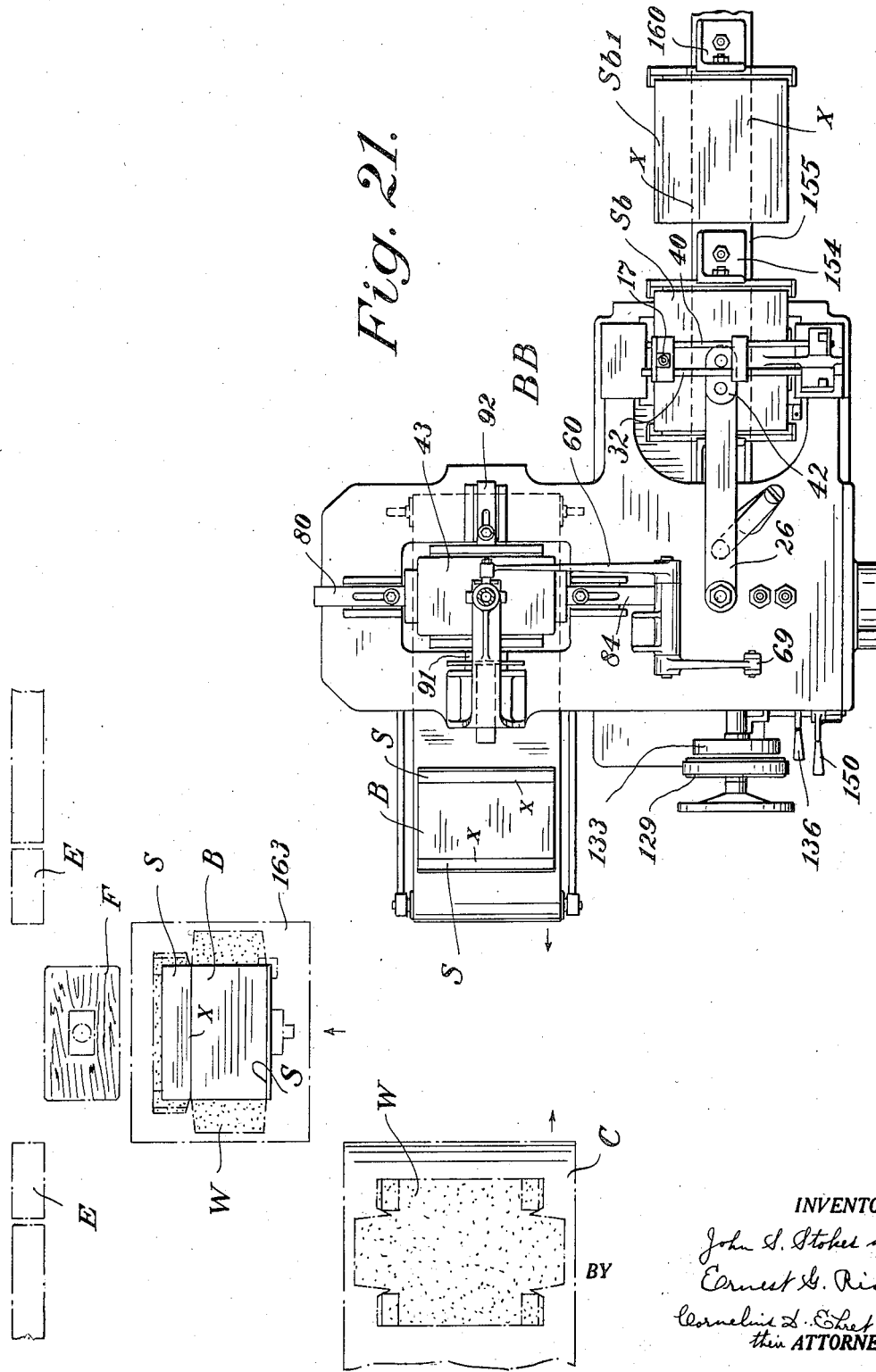

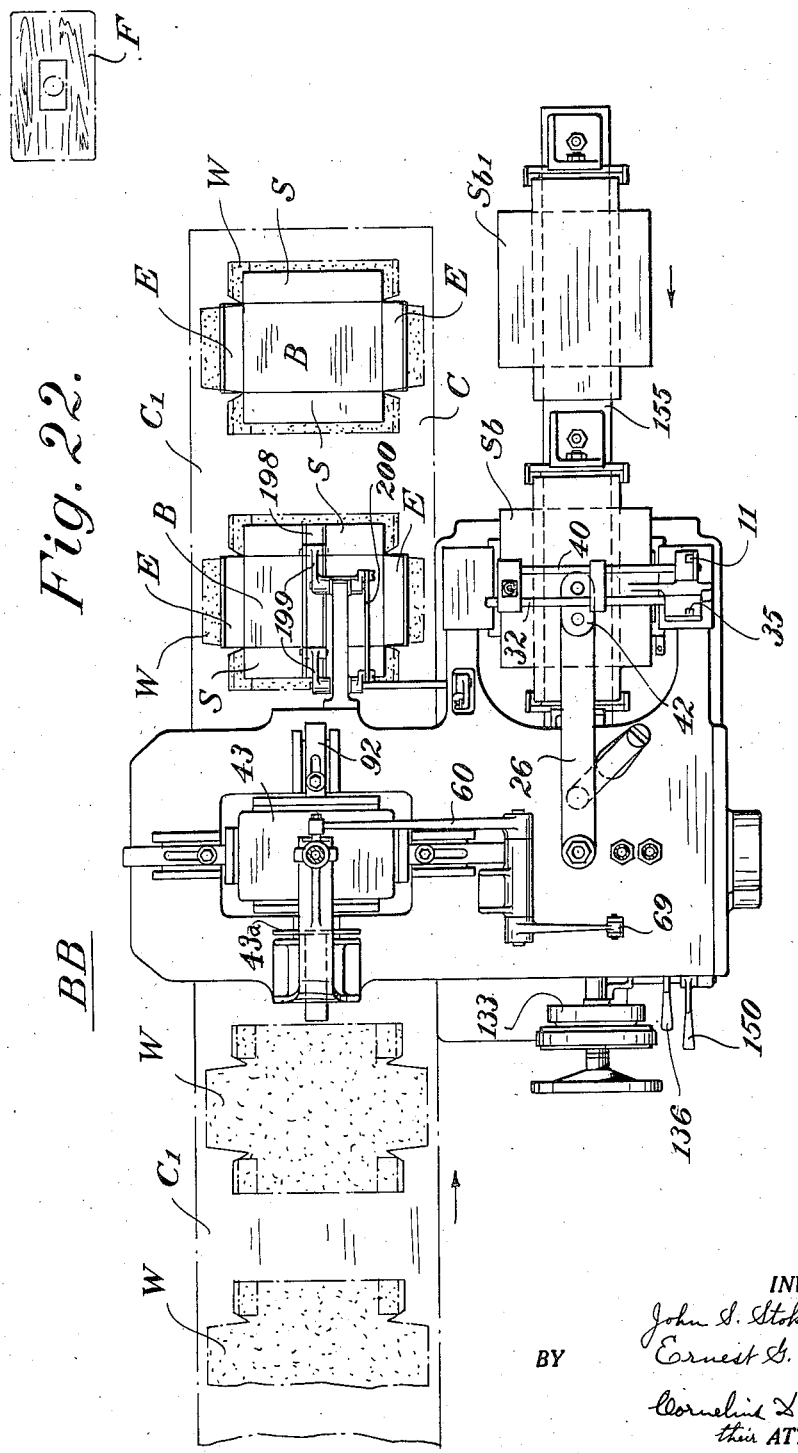

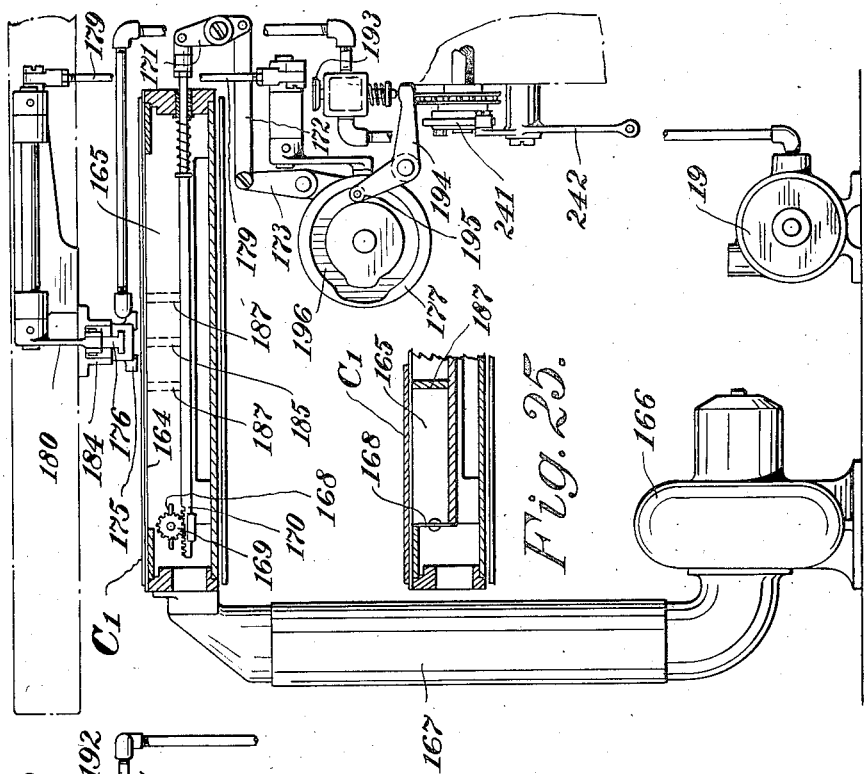
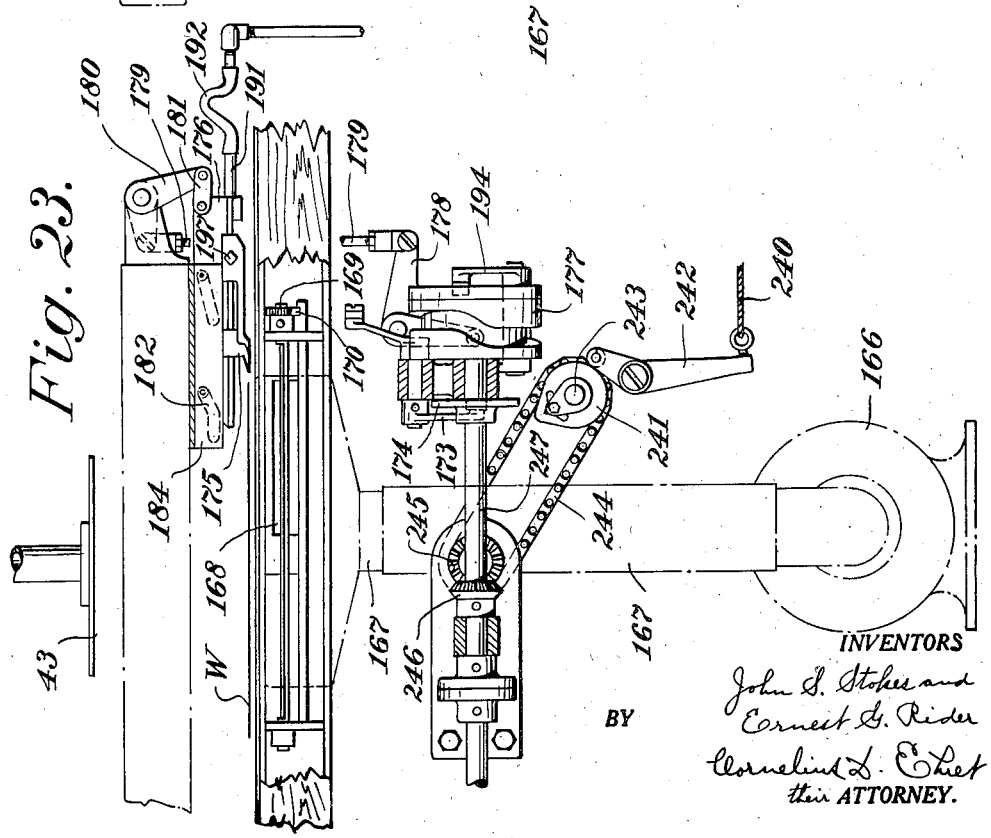

Oct. 22, 1935.  J. S. STOKES ET AL  2,018,237
BOX FORMING SYSTEM
Filed Feb. 28, 1933    17 Sheets-Sheet 13
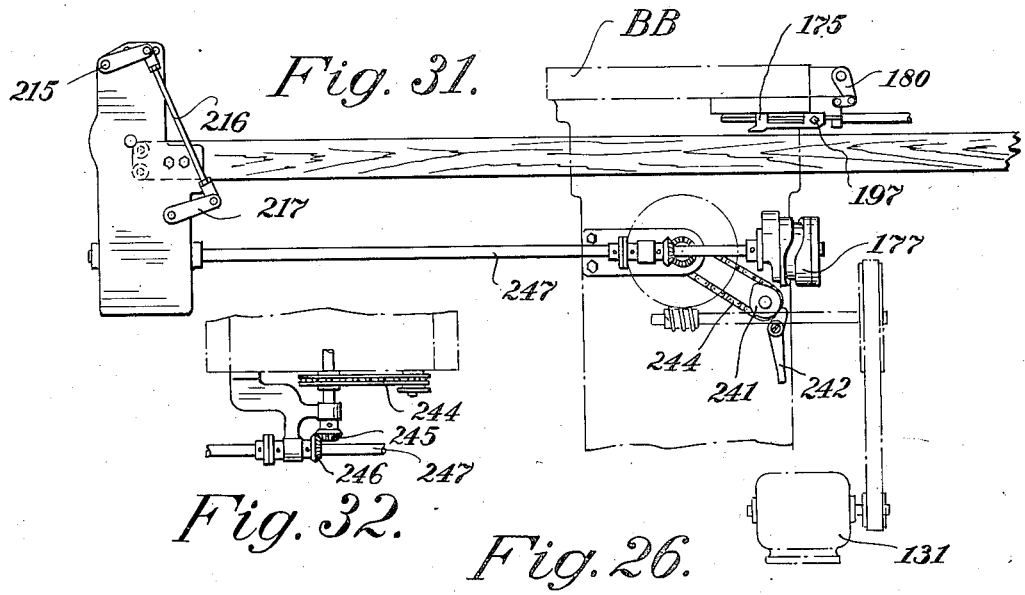
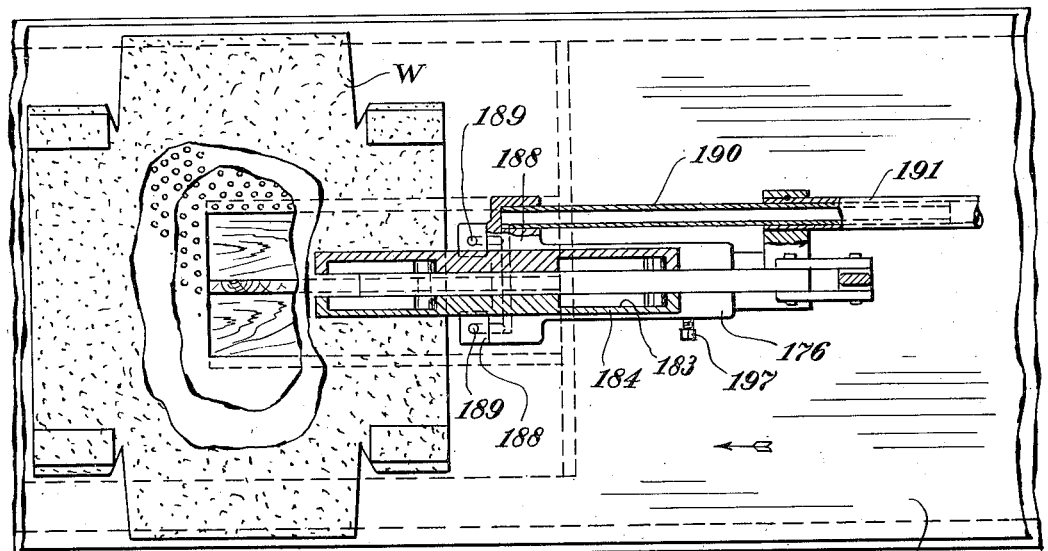
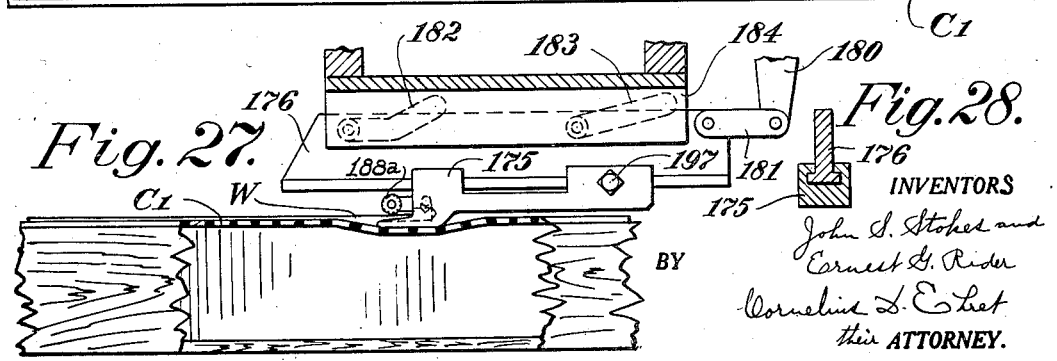

Oct. 22, 1935.  J. S. STOKES ET AL  2,018,237
BOX FORMING SYSTEM
Filed Feb. 28, 1933   17 Sheets-Sheet 14
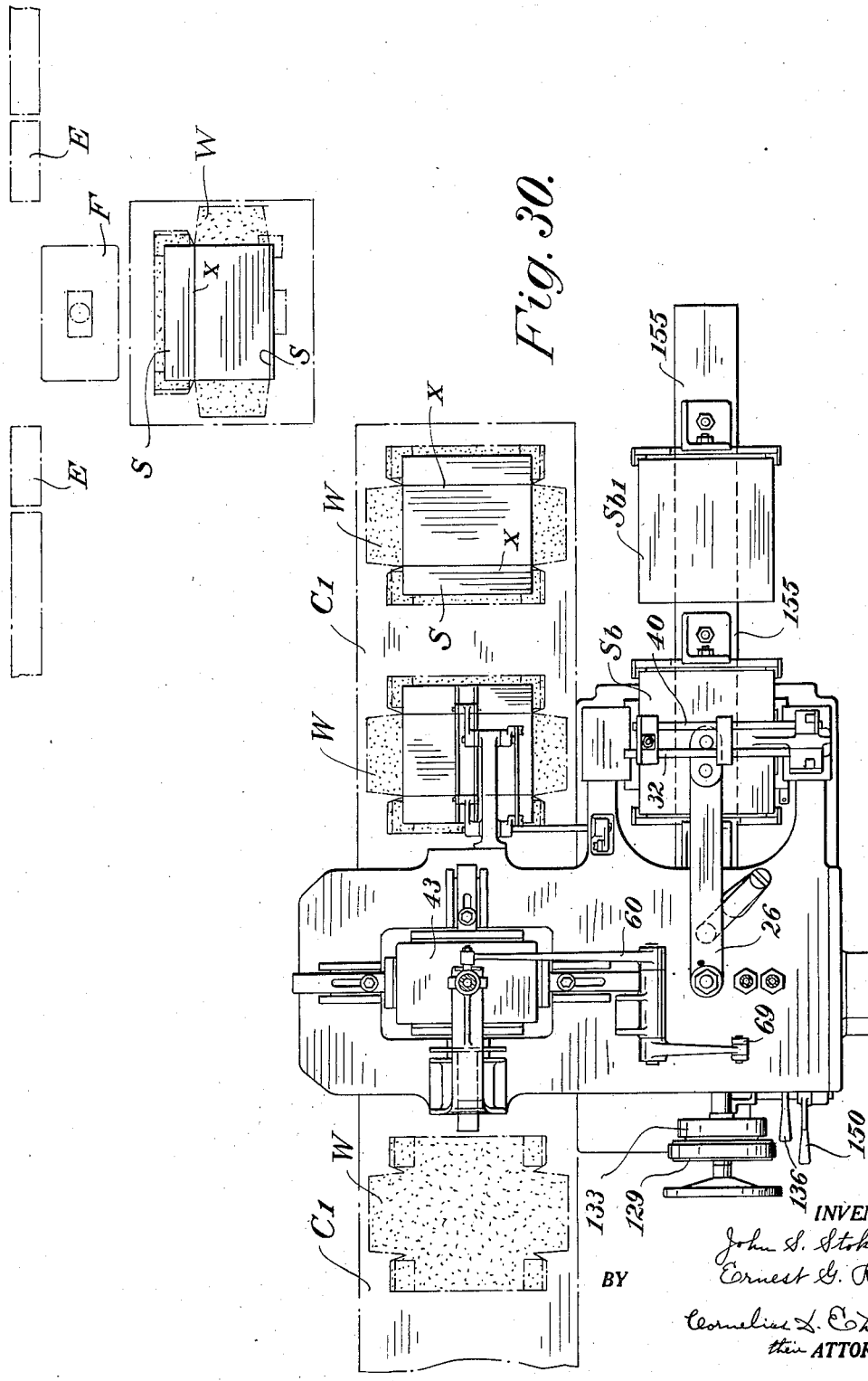
INVENTORS
John S. Stokes and
Ernest G. Rider
BY
Cornelius L. E Shef
their ATTORNEY.

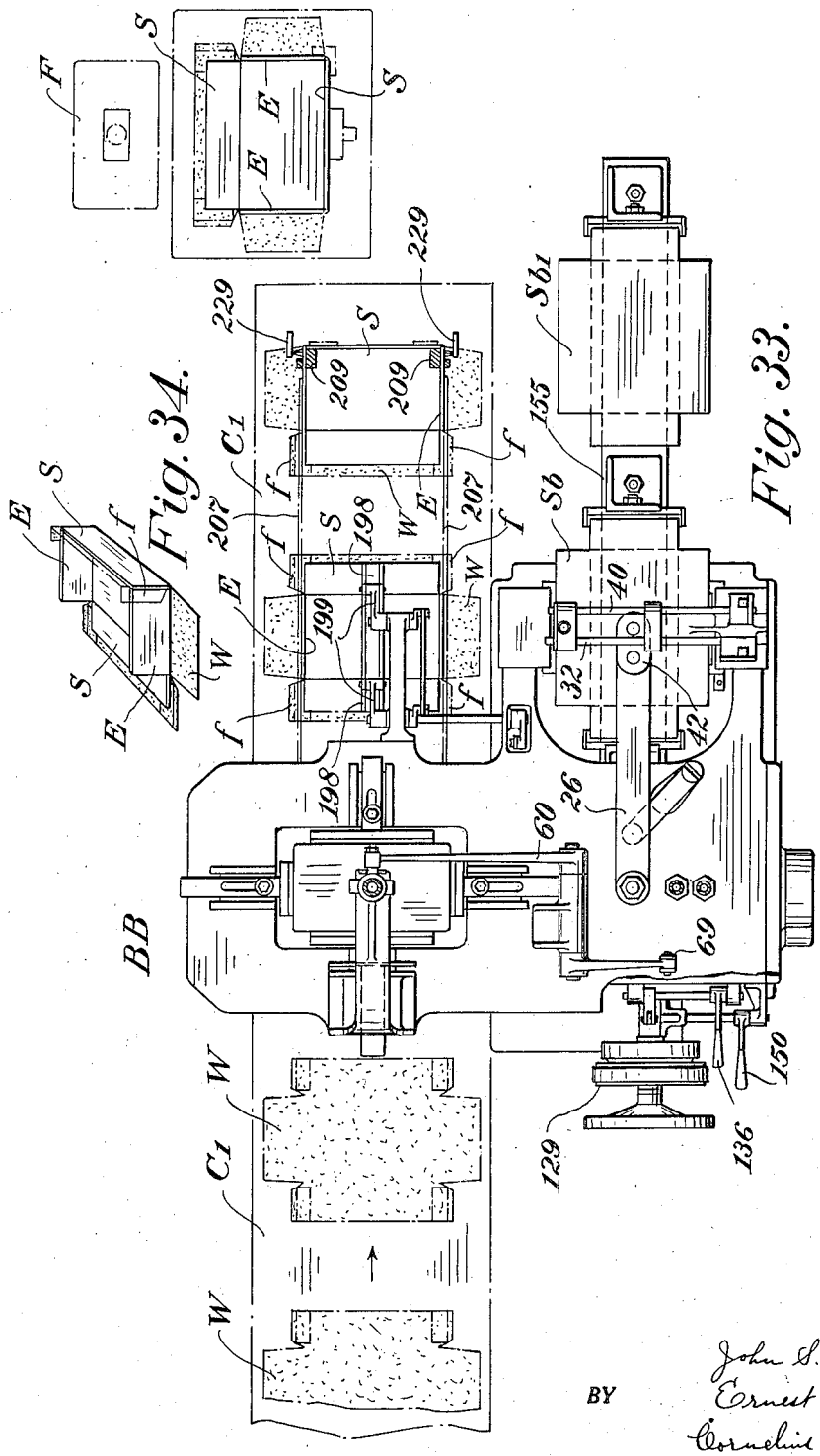

Oct. 22, 1935.  J. S. STOKES ET AL  2,018,237
BOX FORMING SYSTEM
Filed Feb. 28, 1933   17 Sheets-Sheet 16
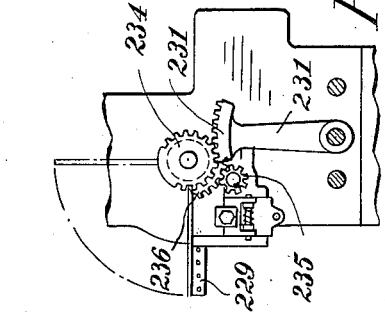
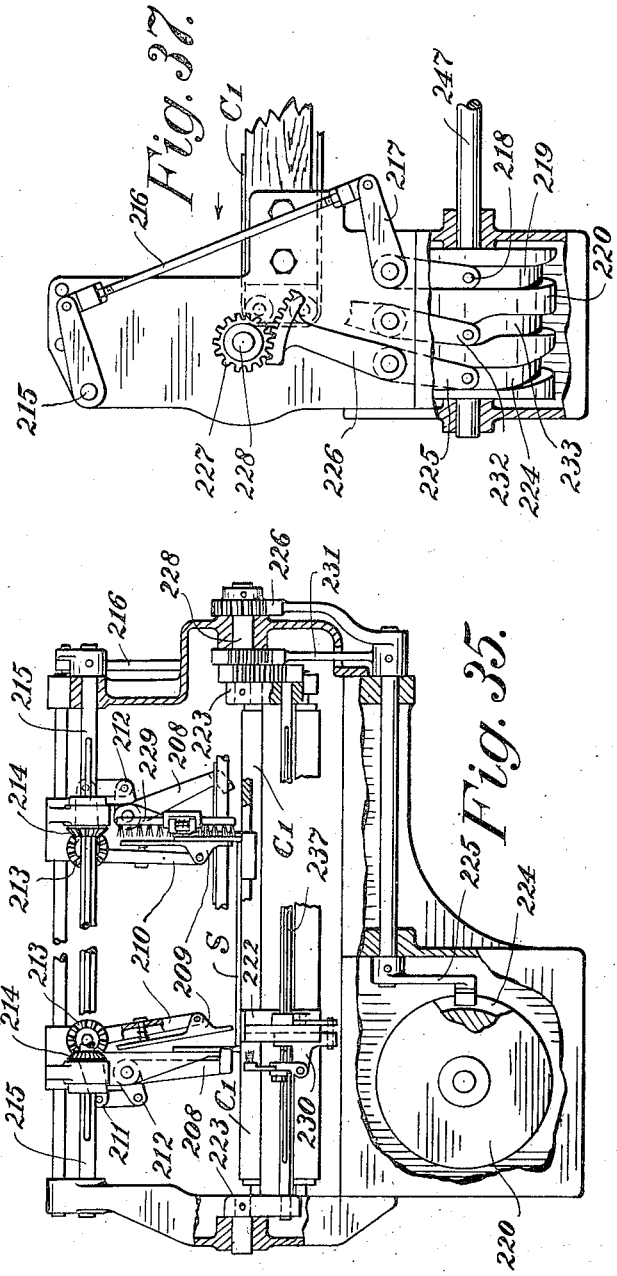
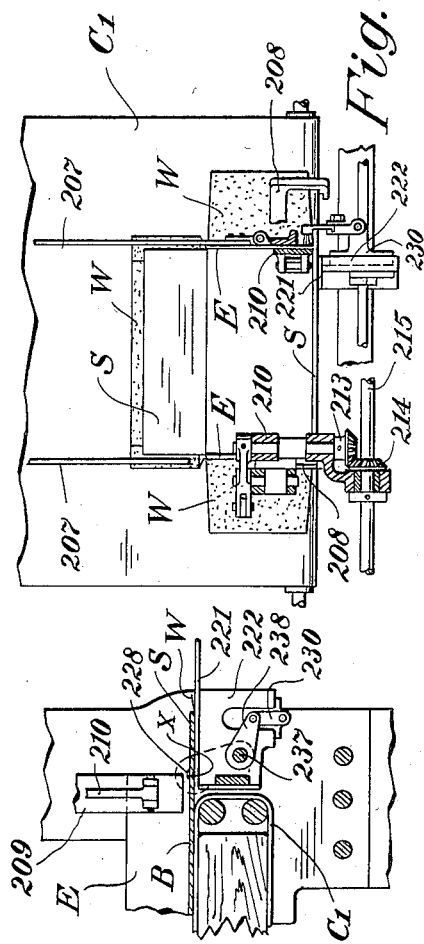

Oct. 22, 1935.   J. S. STOKES ET AL   2,018,237
BOX FORMING SYSTEM
Filed Feb. 28, 1933   17 Sheets-Sheet 17
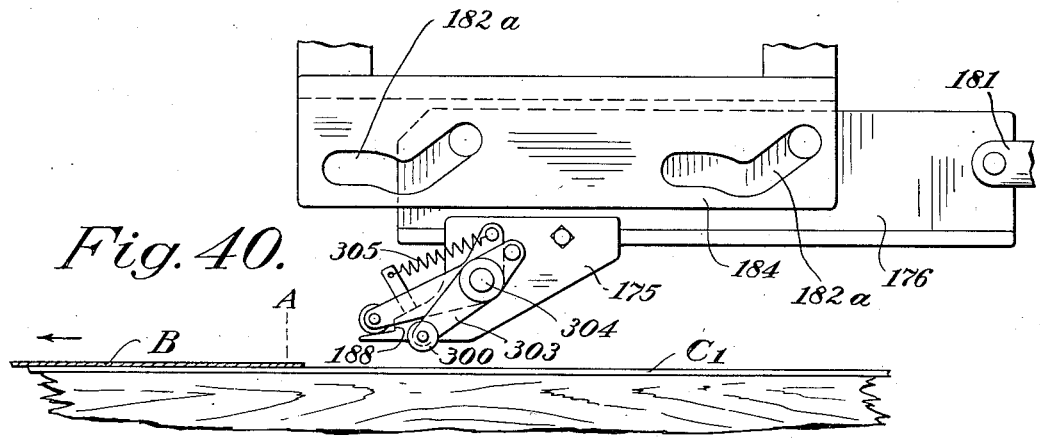
Fig. 40.
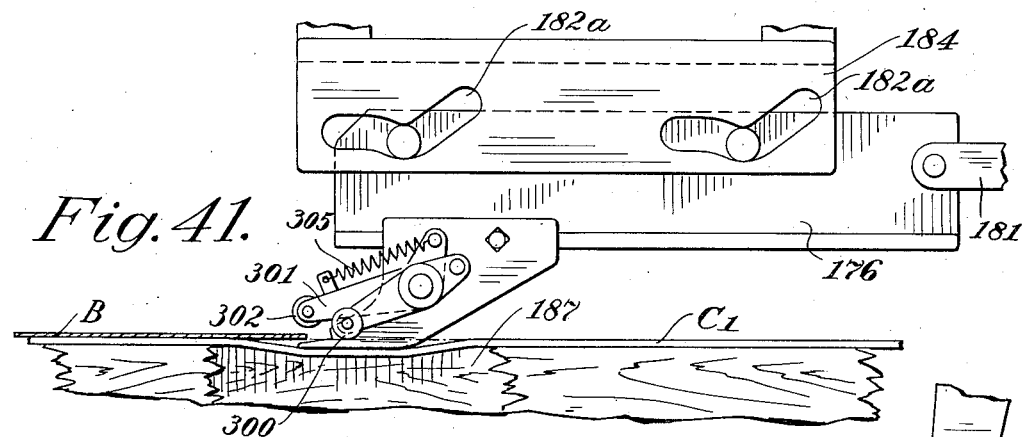
Fig. 41.
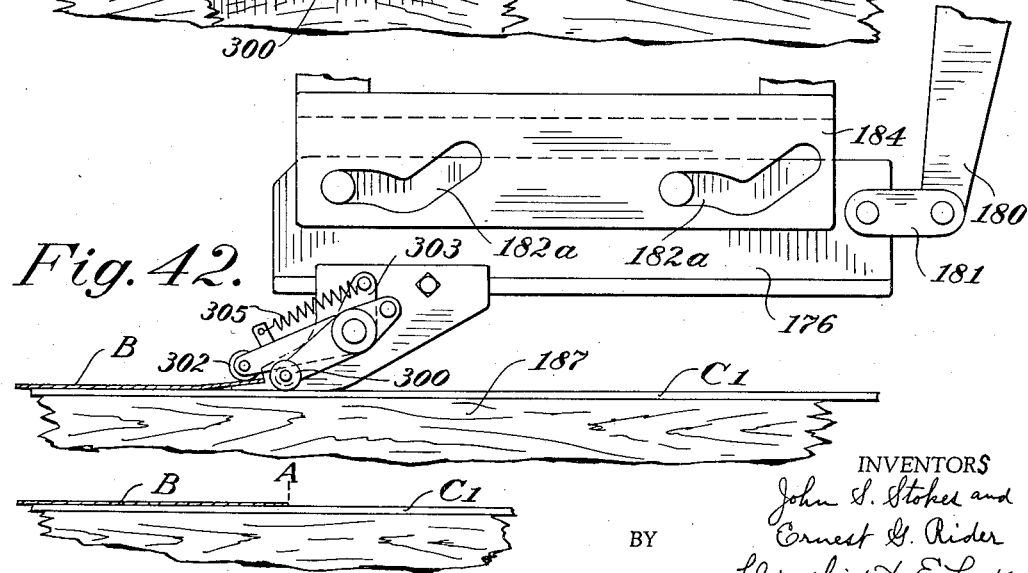
Fig. 42.
Fig. 43.
INVENTORS
John S. Stokes and
Ernest G. Rider
Cornelius D. Ehret
BY
their ATTORNEY.

Patented Oct. 22, 1935

2,018,237

UNITED STATES PATENT OFFICE 2,018,237

BOX FORMING SYSTEM

John S. Stokes, Huntingdon Valley, and Ernest G. Rider, Philadelphia, Pa., assignors to Stokes and Smith Company, Philadelphia, Pa., a corporation of Pennsylvania Application February 28, 1933, Serial No. 658,934

52 Claims. (Cl. 93—43)

Our invention relates to box-forming systems and apparatus, and more particularly to mechanism for bending one-piece box blanks, component blanks of multipiece boxes, cover blanks, and the like, all herein generically termed "box blanks."

In accordance with our invention, box blanks, preferably scored or creased to define the component panels of the box, removed from a stack or received from a blank-making machine, are transferred to a plunger or form, and while each blank is held by or upon the plunger or form, associated mechanism bends or over-bends the panels to or, and preferably, beyond their final box-forming positions; the plunger or form thereafter deposits the blank on a conveyor which transfers the blanks in succession, for example toward a box-wrapping or box-forming station; in some modifications, the bent box blank is deposited on an adhesively coated wrapper or the like on the conveyor, preferably held thereto by suction; the blank and wrapper assembly then moves as a unit toward the wrapping or box-forming station.

Further in accordance with our invention, each wrapper is accurately registered on the conveyor at the station or region at which it receives a bent blank; preferably, the wrapper is released from suction during this registration, and the wrapper and blank assembly is thereafter subjected to suction.

Further in accordance with our invention, one or more of the side or end panels of the applied blank may be flattened against a corresponding panel or panels of the wrapper while on said conveyor to effect further partial covering or wrapping of the blank, and to facilitate transfer of the assembly, either manually or automatically, to the box-forming or wrapping machine.

In one modification of our invention, before the blank and wrapper assembly leaves the conveyor, or before it is delivered to the wrapping machine, some of the box walls, two ends and side for example, are brought to vertical or final box-forming position and there held by partial application of the wrapper.

Our invention also resides in the features of combination, construction and arrangement hereinafter described and claimed.

The mechanism hereinafter described and claimed may be utilized to perform some of the steps of the methods of making boxes disclosed and claimed in Stokes application Serial No. 586,530, filed January 14, 1932.

For an understanding of our invention, and for illustration of several systems utilizing it, reference is to be had to the accompanying drawings in which.

Figure 4:
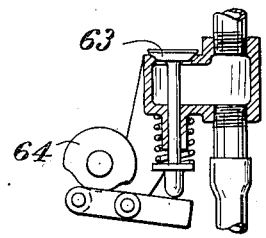
Figure 1:
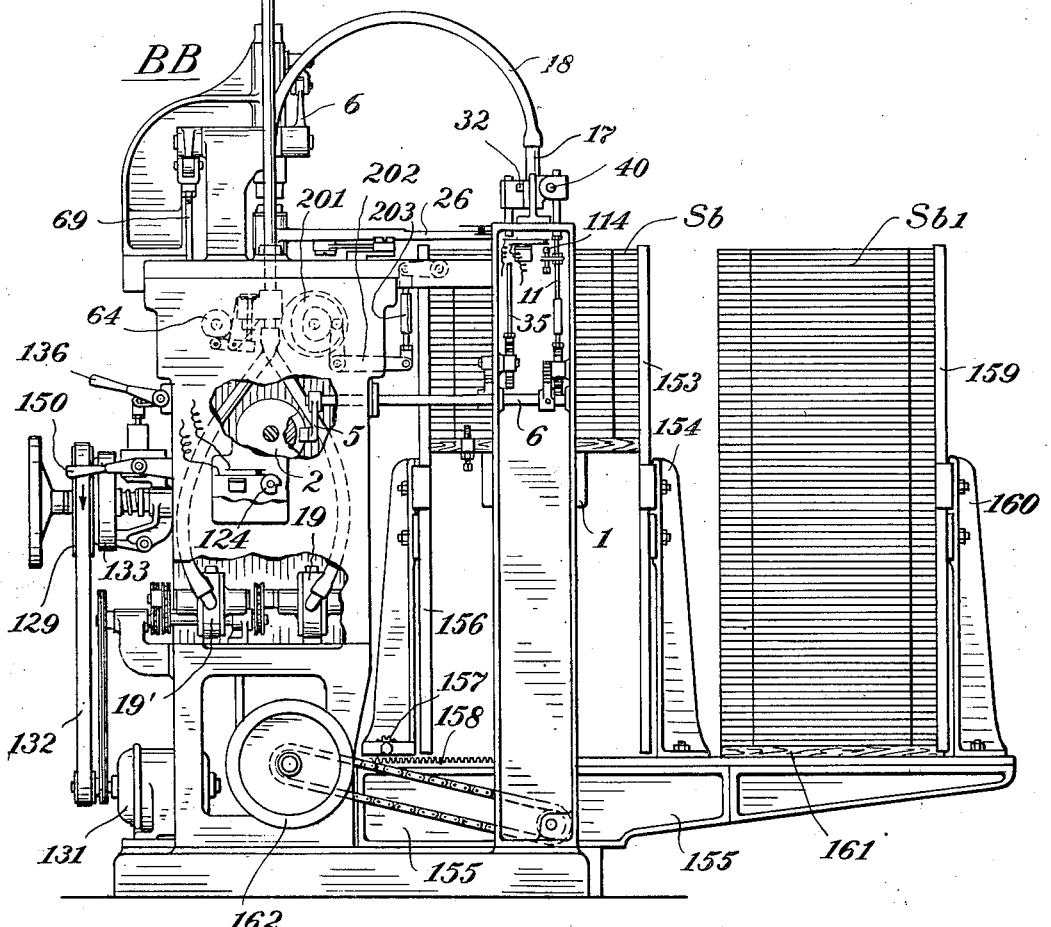
Fig. 1 is a front elevational view with parts broken away, of a box blank-bending mechanism.

Fig. 4 on enlarged scale is a detail view of suction valve mechanism shown in Fig. 1.

Figure 5:
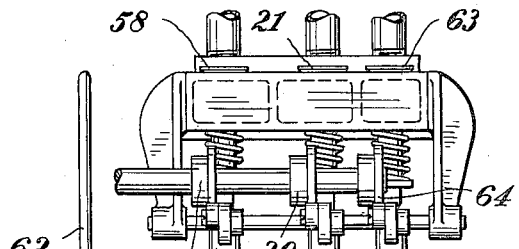

Fig. 5 is a side elevational view of valve mechanism of Fig. 4.

Figs. 6 and 7 are front elevational views, on enlarged scale, of blank separating mechanism shown in Fig. 1.

Fig. 8 is a detail view of parts shown in Figs. 6 and 7.

Fig. 9 is a plan view of the operating cam and mechanism for parts shown in Figs. 6 and 7.

Fig. 10 is a detail view showing the blank separating element in different operating position.

Fig. 11 is a detail view on further enlarged scale of the blank-separating element.

Fig. 12, in section, and on enlarged scale, illustrates the operating mechanism for the blank transfer arm shown in Fig. 1.

Fig. 13 is a top plan view of parts shown in Fig. 12.

Figure 2:
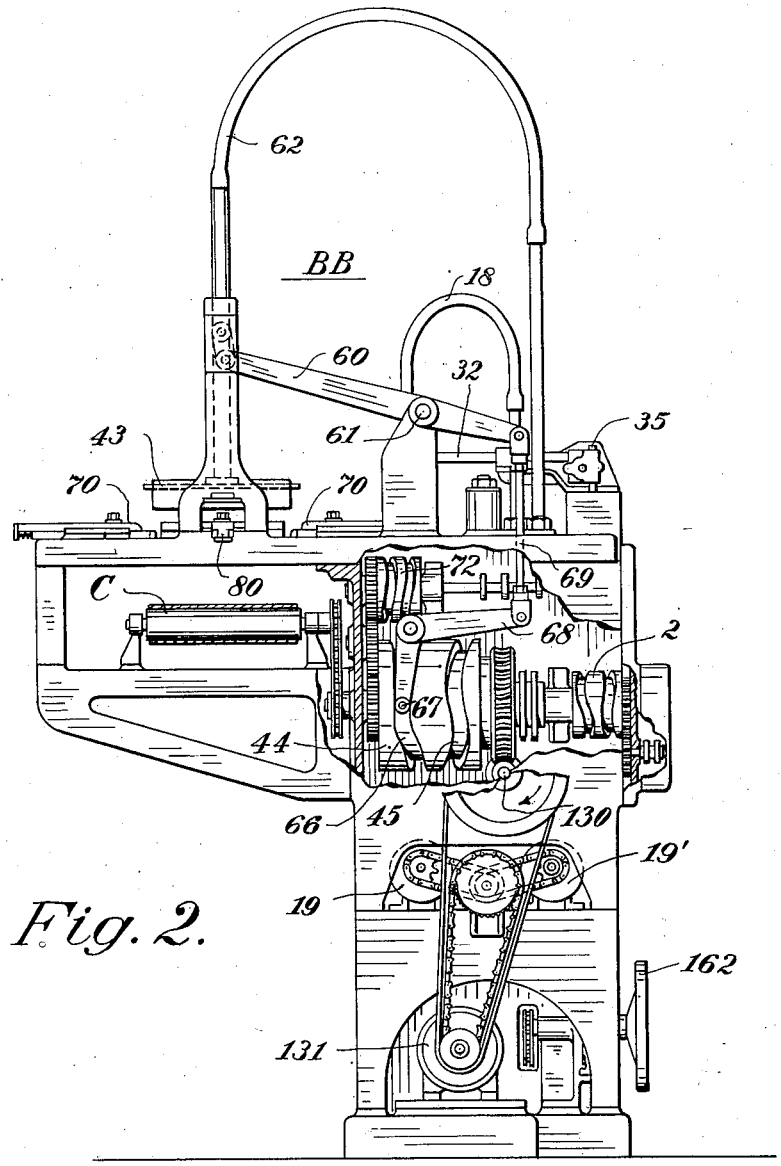
Fig. 2 is an end elevational view with parts broken away and parts in section.
Figure 3:
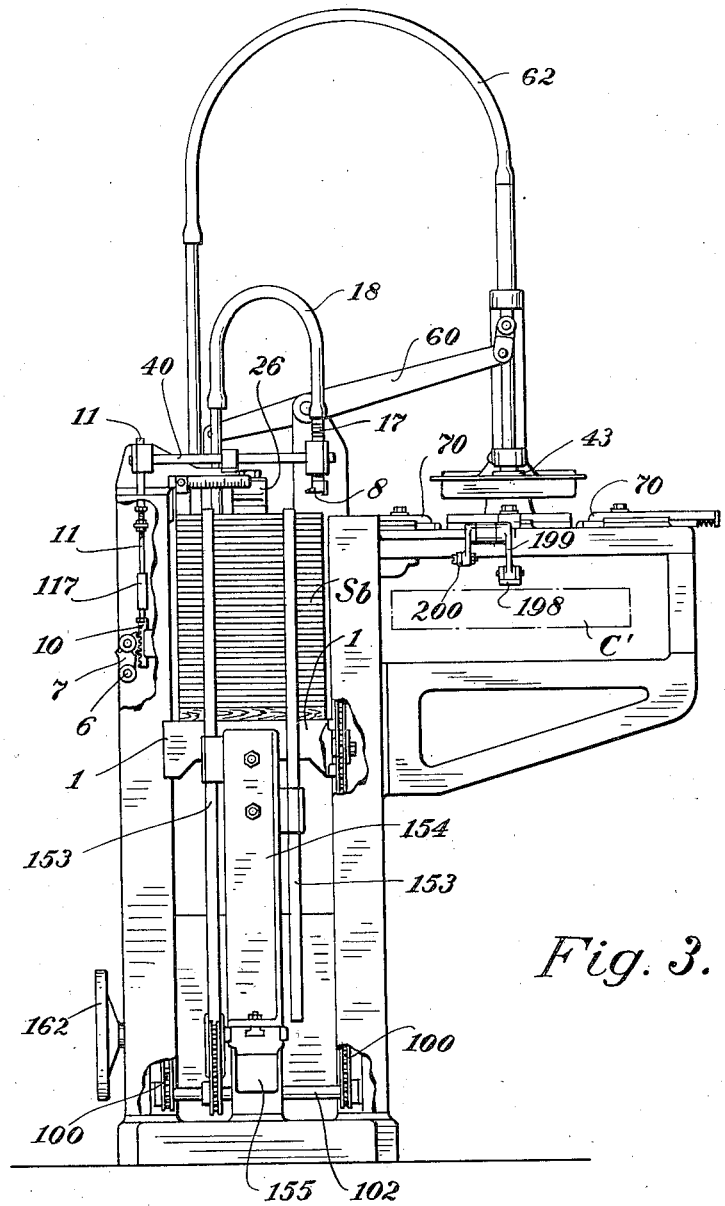
Fig. 3 is an elevational view of the end opposite Fig. 2.

Fig. 14 on enlarged scale, is a top plan view of the blank bending mechanism shown in Figs. 1 to 3.

Figs. 15, 15a and 16 are detail views in elevation, of parts shown in Fig. 14, in different operating positions.

Fig. 16a is an end sectional view of parts shown in Fig. 16.

Fig. 17 is a wiring diagram of the control system of stack-elevating mechanism.

Fig. 18 is a detail view, on enlarged scale, of control mechanism for the box bending machine of Fig. 1.

Fig. 19 is a detail view of a lock-out clutch control.

Fig. 20 is a top plan of a box-wrapping system utilizing the box blank bending machine of Fig. 1.

Fig. 21 illustrates the system of Fig. 20 as used in making multi-piece boxes.

Fig. 22 in top plan illustrates a modification of the bending mechanism shown in Fig. 1 which includes in addition mechanism for flattening side panels of the blank on a conveyed wrapper.

Fig. 23 is a detail view on enlarged scale, of wrapper re-registering mechanism.

Fig. 24, a front elevation in section, illustrates parts shown in Fig. 23.

Fig. 25 is a detail view on enlarged scale of valve mechanism shown in Fig. 24.

Fig. 26 is a top plan view on enlarged scale of the wrapper registering gripper.

Fig. 27 is a sectional view in vertical elevation of parts shown in Fig. 26.

Fig. 28 is a detail view, in end section, of slide structure shown in Fig. 27.

Fig. 29 illustrates mechanism for flattening the blank side panels on the registered wrapper.

Fig. 30 illustrates the system of Fig. 22, as used for making three-piece boxes.

Fig. 31 illustrates mechanism for transmitting motion to parts adapted to partially wrap a box on the conveyor.

Fig. 32 is a top plan view of chain and gear mechanism shown in Fig. 31.

Fig. 33 is a plan view of a system using box-pre-forming mechanism.

Fig. 34 is a detail view of a partially or pre-formed box.

Fig. 35 is a side elevational view of the box pre-forming mechanism.

Fig. 36 is a top plan view of parts shown in Fig. 35.

Figs. 37, 38 and 39 are detail views of parts shown in Figs. 35 and 36.

Figs. 40 to 43 illustrate a modification of the label registering mechanism shown in Fig. 23.

Referring particularly to Figs. 1, 2 and 3, the blank bending mechanism BB is adapted to take box blanks from a stack or from a box body machine, such as described and claimed in co-pending application Serial No. 655,194, filed February 4, 1933, bend them along their scoring, and deposit the bent blank on a conveyor for transfer toward or to a box-wrapping station.

Assuming for purpose of explanation, that the box blanks are to be removed from a stack, the stack Sb of blanks is disposed upon the table 1 of the machine which is elevated by mechanism hereinafter described, to maintain the top of the stack at substantially a predetermined position.

The cam 2, Figs. 6, 7, and 9, is provided with a groove 3 to receive cam follower 4 carried by arm 5 attached to one end of a shaft 6 to whose other end is affixed a gear segment 7. The oscillation of arm 5 is transmitted to the blank separator head 8 through gear 9, rack 10, rod 11, rack 12, gear 13, shaft 14, gear 15, and rack 16 which is attached to or forms part of the support 17 carrying the blank separator head 8.

Accordingly, during the operation of the machine the head 8 moves from its raised position shown in Figs. 6 and 7 downwardly into engagement with the top of the pile selectively to lift the top blank. As shown more clearly in Fig. 11, the head 8 is hollow in order that suction may be applied for lifting of the blank. The interior of the head is in communication through a passage in the supporting member 17 and the hose 18, with a suction pump 19.

The cam 20 which controls the cut-off valve 21 for suction to the head 8 is suitably timed so that suction is applied while the head is in contact with the blank, and is released after the blank has been lifted to the position shown in Fig. 10 and engaged by other transfer mechanism hereinafter described.

To assist in separating the blanks, the head 8 is provided with a spur member 22 extending inwardly from the plate 23 suitably attached to the back of the lifting head 8 as by screws 24. During descent of head 8, the spur 22 is sufficiently to the right of the edge of the stack, as viewed in Fig. 6 to clear it. After engagement with the top sheet of the stack, the support 17 is moved bodily to the left as will now be described, to press the spur into the edge of the sheet. This motion brings the edge of the sheet against the plate 23. The opposite edge of the sheet is restrained or held by the stack guide 25.

After the head is raised to the position shown in Fig. 10, and held by transfer arm 26, the suction is cut off, and the head is moved slightly to the right to remove the spur 22 from the blank, and then the head is slightly lifted to clear the blank so that it is out of the path of movement of the blank as effected by the transfer arm 26.

The in and out movement of the support 17 for the blank separating head 8 is effected primarily by the groove 27 of cam 2, which as shown most clearly in Figs. 6 and 9 engages the follower 28 at one end of shaft 31, to effect to and fro movement of the gear segment 30 at the other end of shaft 31. The motion is transmitted to the reciprocating support 32 by gear segment 33, rack 34, shaft 35, rack 36 and gear 37 which engages a rack 38 attached to or integral with the supporting member 32. As the support 32 moves to the left it carries with it the housing member 39 which guides the reciprocating support 17 for the suction head 8 and which also carries the gear 15 for continuous meshing engagement with rack 16. The gear 15 as indicated is slidable on the key 40 of shaft 14 which does not reciprocate. The relation between these parts is perhaps most clearly shown in Fig. 8.

The suction head 8, as shown in Fig. 11 is pivoted at 41, so that as the head is raised, the right-hand edge of the top blank is lifted, allowing the arm 26 as it is swung to the left, Fig. 10, or clockwise, to the position shown in Fig. 30, to pass between the separated blank and the stack to lift the blank in its entirety, substantially parallel with the top of the stack. This movement is permitted by the pivoted head 8, which retains control of the blank. With the blank fully raised, suction is applied through the pad 42, Fig. 33, at the end of arm 26 to the blank, and the head 28 is released and moved somewhat above the blank as above described.

The operating mechanism for arm 26, now described, swings the arm 26 and attached blank in counter-clockwise direction as viewed in Fig. 20, to bring the blank in registered position below the plunger 43. The stop bar 43a engages the transferred blank to assist in registering it if perchance it is not accurately centered on pad 42. The operating mechanism for arm 26 is shown most clearly in Figs. 12 and 13. The cam 44 provided with a track or groove 45, engages the cam follower 46 of an arm 47 secured to one end of a shaft 48 to which is also secured gear segment 49, which through gear segments 50 and 51 transmits motion to gear 52 connected to shaft 53 to whose upper end is secured a crank member 54. The link 55 connects crank 54 to arm 26, the pins 56 and 57 carried by the arms 26 and 54 respectively, provide the bearings for link 55. The linkage and motion transmitting mechanism is so designed that when the arm 26 is in its limiting position above the stack, the pins 56 and 57 are on dead center, i. e., the centers of pins 56 and 57 are in a straight line including the center of shaft 53. This insures that all lost motion is taken up and that the arm will always come to a definite position. Similarly, when the arm 26 is in its other limiting position beneath plunger 43, the axes of pins 56, 57 and shaft 53 are again in a straight line. Of course, now the pin 57 is between the pin 56 and shaft 53, whereas for the other limiting position, the relation is as shown in Fig. 13, with shaft 53 between the pins.

The suction of pad 42 is controlled by valve 58, Fig. 5, actuated by cam 59. The suction in pad 42 is cut off and arm 26 moved back to its position over the stack, after the plunger 43 has descended and assumed control of the blank.

Referring particularly to Fig. 2, plunger 43 is slightly above the plane of movement of arm 26. After a blank has been brought to position beneath the plunger 43, the arm 60 is rocked in counter-clockwise direction about its pivot 61 to effect registered engagement between the plunger and the central or box bottom panel of the blank. The suction head is hollow, and in communication with the suction pump through the hose 62. Upon occurrence of the aforesaid engagement, valve 63 is closed by cam 64 to hold the blank against the head. The arm 26 thereupon moves from beneath the blank to position above the stack, as previously described.

The downward movement of the plunger which is then resumed is primarily controlled by the cam groove or track 66 of cam 44 which engages the follower 67 at one end of the bell crank lever 68 whose other end is connected by link 69 to the arm 60 which supports the plunger 43. The plunger 43 in carrying the blank downwardly for deposit upon the conveyor C passes adjacent the several box bending devices shown most clearly in Figs. 14, 15 and 16.

The length and width of plunger 43, which is a thin plate, substantially correspond to, or are slightly less than, the length and width of the bottom panel of the box blank, so that the side panels S and the end panels E of the box blank project beyond the plunger plate. As the plunger approaches the position shown in dotted lines in Fig. 16, the side panels are engaged by and bent upwardly by the bending bars 70, 70, and similarly the end panels E are thereafter bent upwardly by the bending bars 71. The plunger momentarily stops at this position whereupon first one pair of bars 70, 70 and then the other pair of bars 71, 71 move inwardly sharply to bend the blank along its scoring as generally indicated at Fig. 15.

The mechanism for effecting this operation is most clearly shown in Fig. 14. The cam 72 is provided with a groove 73 for the cam follower 74 which is carried by arm 75, pivoted at 76, one end of the arm being connected by link 77 to the arm 78 which is connected by link 79 to the slide 80 which carries one of the bending bars 71. The other end of arm 75 is connected by link 81 to lever 82 connected by link 83 to the opposite slide 84 carrying the other end bending bars 71. Cam 72 is also provided with track 85 for the cam follower 86 carried by arm 87 which is connected by link 88 through the bell crank lever 89 and link 90 to the slide 91 which carries one of the side panel bending bars 70. The opposite side-bending bar carried by the slide 92 is similarly operated from a cam 93 by bell crank lever 94, link 95, lever 96 and cam follower 97.

The slides and links are adjustable, as indicated, to accommodate boxes of different length and/or width. The slides are adjusted for a particular size box so that when the lower bars 98, 98 are in their retracted position, as shown in Fig. 16, the distance between them is substantially equal to the width of the box bottom plus the thickness of the box sides, and similarly the end slides are adjusted so that when the lower bending bars 99 are in their retracted position the space between them is substantially equal to the length of the box plus the thickness of the box ends. As shown in Fig. 15, the upper bars and lower bars of each slide are slightly spaced vertically to provide a groove for bending of the box panels beyond their final or box forming position as the slide is moved inwardly, (Fig. 15). The squaring bars or abutments 98a secured to the lower bars 98 engage the four edges of the bottom panel of the blank to re-square or center it if necessary. The upper surfaces of bars or plates 98 support the blank during the folding of panels E, and panels S by the uppers, as above described. The bending weakens or fractures the fibres of the box material along the scoring so that when the box is subsequently wrapped there will be no tendency for the sides of the box to bend or bow.

After all four sides of the box have been bent, and all slides have been returned to their retracted position, the downward movement of the plunger 43 is resumed, to bring the box blank B upon a conveyor C which preferably is intermittently movable, and at rest when the blank is deposited thereon. Due to resiliency of the material, the panels after they have passed the lower bars 98, 99 swing outwardly to some extent, generally as shown in full lines (Fig. 16). Before the plunger is moved upwardly, the suction applied thereby is broken by valve 63 to allow the blank to remain on the conveyor. The plunger returns to its upper position and immediately thereafter another blank is brought thereto by the arm 26, and the cycle of operation is repeated.

Provision is made to keep the top of the stack Sb at a predetermined level within suitably narrow limits and so compensate for the removal of the blanks. The table 1 is connected to links of the chains 100, 101 which are driven by sprockets on shaft 102, whose movement is effected by shaft 103, Fig. 18. To the shaft is secured a ratchet wheel 104 and loosely mounted on the shaft is the arm 105 carrying the pawl 106. The arm 105 is held in the position shown by the latch 107 which engages the abutment 108 of the arm. Accordingly, as the link 109 is lifted and dropped by cooperation between the cam 110 and the cam follower arm 111 connected to link 109, the lifting piece 112 carried by link 109 simply slides up and down on the pin 113 carried by arm 105. The arm 105 remains in its latched position so long as the top of the stack is not less than the predetermined level, determined by the setting of the contact operating member 114 carried by the rod 11, Fig. 7, for lifting and dropping the blank separating head 9. Between the rack 10 and link 11 there is a lost motion connection afforded by the pin 115 between rod 11 and slot 116 in the tubular member 117. The stroke of the rack 10 is such that the head 8 engages the top of the stack when at the desired level, before the end of the upper movement of rack 10, so that rod 11 due to contact of head 8 with the stack stops short of the position for which the member 114 effects engagement of contacts 118, and the remainder of the upper movement of rack 10 is effective only to compress the spring 119. When, however, the top of the stack falls below the desired level, the operating member 114 effects engagement of contact 118 to energize the solenoid 120, Figs. 17 and 18. The upward movement of the core member 121, Fig. 18, rocks the latch member 107 to the right to unlatch the arm 105 which is thereupon moved in counter-clockwise direction by spring 122. The pin 113 is therefore moved to the bottom of the slot in the constantly reciprocating member 112, so that when this member is next raised, the arm 105 is swung in reverse direction and its pawl 106 through ratchet 104 effects stack elevating movement of shaft 103.

The latch member 107 in moving to its unlatched position, as described, closes the contacts 123 to complete a seal-in circuit for the solenoid 120 so that the solenoid remains engaged after the separation of contacts 118. The cam 124 interrupts the seal-in circuit after the arm 105 has been lifted by the member 112 so that the latch 107 may swing into position to again restrain arm 105, upon downward movement of member 112.

The cam 125 operates the contacts 126 to hold the solenoid circuit open, and in general to keep the line dead except during that portion of the cycle when current is needed for control of the stack-elevating means. The contacts 127 are normally closed but are opened in event of over-travel of empty table 1 by the abutment 127a extending therefrom to interrupt the solenoid circuit to preclude operation of the stack-elevating means.

Resistance 128 is utilized to maintain the current in the control circuit suitably low.

If the blanks, instead of being removed from a stack, are received from a machine for making box-blanks, such as for example, of the character disclosed in application Serial No. 655,194, filed February 4, 1933, the stack feeding mechanism may be omitted, or if retained, rendered inoperative, as by disconnecting the solenoid control circuit from the source of current supply.

The bending machine BB is preferably provided with a one-cycle clutch which stops the mechanism after each cycle, and which may be tripped either manually, or by mechanism connected to other machines of the box wrapping system for maintaining them in synchronism. Referring to Figs. 1 and 18 the clutch member 129, freely rotatable upon shaft 130, is continuously driven from motor 131, as by belt 132. The driven clutch member 133 is secured to shaft 130 and biased toward engagement with the driving clutch member 129 by spring 134. To effect engagement of the clutch the latch 135 is lifted by handle 136, or by the trip cable 137, so that the nose of the latch passes above the shoulder 138 of the slidable locking member 139 which is pivoted to the upper end of the arm 140 whose lower end is pivoted at 141 to the bracket 142 of the frame of the machine, and to which is pivoted intermediate its ends, the clutch yoke or ring member 143. The unlatching of the bar 139 permits the spring 134 to force the driven clutch member 133 into engagement with the driving clutch member 129, and simultaneously the brake member 144 is released from engagement with the interior face of the brake drum 145, the counter-clockwise movement of lever 140 as viewed in Fig. 18 permitting the spring 146 to swing the brake arm 144 in clockwise direction.

Near the end of the cycle of the machine, the cam 147 through bell crank lever 148 moves the slide 149 to the left so that the latching plunger 135 drops into the notch of the slide member 139; the further movement of the cam moves the slide 139, through latch 135 and shoulder 138, to the right, thereby to withdraw the driven clutch member, and simultaneously the brake arm 144 is forced downwardly into engagement with the interior surface of the brake drum 145 to arrest the moving parts of the bending mechanism and prevent their over-travel due to inertia. The clutch can be locked out so that the machine cannot be tripped to effect operation, by the handle 150 which is provided with a cam 151 engaging the pin 152 of the slide 139 to hold the slide in the position shown in Figs. 18 and 19. So long as the handle 150 is in this position, the lifting of latch member 135 is without effect upon the clutch.

The blanks delivered by conveyor C may be stacked and stored for future use though preferably the bending machine is a unit of a system which utilizes the blanks substantially immediately after they are bent.

Fig. 20 illustrates one of the many possible box forming or wrapping systems utilizing the bending machine as thus far described. The box blanks bent along their scoring x, x, y, y, are delivered from the box-bending mechanism by the conveyor C to an operator who brings them into registering position on an adhesive coated wrapper W for wrapping of the assembly by a wrapping machine generically illustrated by the form block F, and which may be of any suitable type, for example, such as shown in U. S. Letters Patent No. 1,541,036. The wrappers, preferably tabbed, may be delivered to the operator by the conveyor C1 of a gluing machine of the type disclosed in U. S. Letters Patent No. 1,857,260. The wrapping machine and the gluer are preferably synchronized as already known in the art, so that each time the operator trips the wrapping machine a label is coated with adhesive and delivered to the conveyor C1. The bending machine is synchronized to the other two units of the system by connecting the trip cable from the wrapping machine or the gluing machine to the trip handle 136, as shown in Fig. 18.

To facilitate re-loading of the bending machine, a duplex stack table is provided. When one stack is exhausted, the guide plate 153 and its standard 154 are detached from the base member 155. The rear guard plate 156 guided by the frame 155 and provided with gears 157 meshing with the rack 158 of the frame 155, remains stationary except for adjustment for different sizes of blanks to center the stack below the transfer arm 26. The rear stack Sb1 with its guide 159 and frame 160 is then pushed forwardly to bring this stack in position beneath the lifting head 8. The plate 161 which supports the stack Sb1 and forms the base of it is thus brought above the table 1 which in the meantime has been brought by hand to its lowest position, so that operation of the machine may be resumed. The hand wheel 162 is provided for lowering of the table 1 after depletion of the stack, and to bring the top of the first stack approximately into position to initiate actual transfer of the blanks during operation of the machine without need for waiting for the automatic stack elevating mechanism previously described, to bring the top of the stack to proper level.

Fig. 21 illustrates the bender when used as a unit of a system for making three-piece boxes. In this case the stacks Sb instead of being composed of one-piece box blanks having a bottom and four side panels, are composed of blanks each adapted to form the bottom and two opposite sides of the box, as clearly appears in the drawings. The bending machine operates as above except that the slides for bending the end panels of the blank do not function. The blank bent along the scoring $x, x$ is delivered to the operator as before. The blank may be registered on the wrapper while the wrapper is on the delivery end of the conveyor C1, or the blank and wrapper may be brought into registering engagement on the table 163 of a wrapping machine preferably of the type disclosed and claimed in Rider and Bailey application Serial No. 490,400, filed October 22, 1930, or Rider application Serial No. 611,995, filed May 18, 1932, from which the assembly is fed, to the form block F, to which are delivered end panels E of box material cut from strips and which during the wrapping operation are brought into box forming position with respect to the blank B and are united thereto by folding of the wrapper panels, all as described in the aforesaid applications Serial No. 490,400 and No. 611,995.

By extending the conveyor C1 so that it passes beneath the plunger 43, as shown in Fig. 22, the conveyor C may be dispensed with, and registering of the bent blanks upon the wrappers can be effected automatically. The operator need only take the box and wrapper assemblies from the delivery end of the conveyor belt C1 and transfer them to the wrapping machine.

To insure that the wrapper shall be exactly in aligned position beneath the plunger 43, there is provided an arrangement for re-registering the wrapper at the station where it is to receive a box blank. This mechanism is shown in Figs. 23 to 28. The wrappers during their travel from the gluing machine to the bender are held flat by suction to prevent bowing or curling. The conveyor belt C1 of pervious fabric, or preferably a perforated rubber belt as described and claimed in Stokes Patent No. 1,701,317, is supported by a perforated plate 164 which forms the top wall of a suction chamber 165 connected to suction pump 166 through the pipe or duct 167. The suction chamber 165 is provided with a zone or region beneath the bending plunger 43 which can be cut off from the remainder. The mechanism for effecting the intermittent movement of the conveyor C1 is adjusted so that each wrapper W moves over this zone. With the conveyor stationary and the wrapper in this zone, the suction is cut off by the butterfly valve 168 (Fig. 24) which is operated through gear 169 and rack 170, lever 171, link 172, and lever 173 from the cam 174, Fig. 23. The gripper 175 suspended from carriage 176 is normally substantially above the surface of the conveyor. When the wrapper is in the position above mentioned, the cam 177 through the lever 178, link 179, bell crank lever 180 and link 181 moves the carriage 176 in the direction of travel of the conveyor belt. As the carriage 176 moves forwardly, it drops towards the surface of the conveyor due to the inclined slots 182, 183, in the guide plates 184, so that the toe of the gripper depresses the central part of the conveyor belt on either side of the partition 185 dividing the opening 186 in the plate 164. This partition and the side walls 187 define a non-suction zone, and support the plate. The toe of the gripper for further forward movement of the carriage 176 slides beneath the wrapper W until the rear edge of the wrapper engages the shoulders 188; the star wheel 188a or equivalent preventing the wrapper from buckling. The further movement of the slide effects movement of the wrapper bodily. The furthest limit of travel of the carriage is definitely determined. Suction is applied in this position through the ports 189 of gripper 175 and direction of travel of the gripper is reversed until the wrapper is brought to a registered position beneath the plunger. Preferably, the gripper suction is continued until bender plunger 43 descends, attaching the box blank to the wrapper. Suction is then completely or largely cut off. Suction is applied to the gripper through the telescoping tubes 190, 191, and flexible tubing 192.

The application and discontinuance of suction through ports 189 is controlled by the valve 193, Fig. 24, operated by the bell crank lever 194, which carries a cam follower 195 received by the groove 196 in cam 177.

After the wrapper is registered, the butterfly valve 168 is operated to re-apply suction to the wrapper and hold it accurately in position. Whereupon, the gripper 175 is retracted to its original elevated position.

The machine is so timed that after the wrapper is registered the bent box blank is deposited thereon by the plunger 43. The wrapper and bent box blank are then moved as an assembly by the conveyor.

It is to be understood, of course, that many of the operations described are being concurrently performed. That is, as wrappers are being fed by the conveyor towards the station where they receive box blanks, box blank and wrapper assemblies are being conveyed towards the wrapping station, and box blanks are in intermediate steps of their transfer from the stack to the conveyor.

To accommodate different size wrappers, the gripper 175 is adjustably secured to the carriage 176 by suitable clamping means, as bolt 197.

A simpler and preferred arrangement for registering the wrappers is shown in Figs. 40 to 43. A mechanical gripper is utilized instead of a suction gripper. With the conveyor stationary and wrapper B in the position shown, the slide 176 is moved forward, or to the left; the toe of the gripper 175 due to the cam slots 182a depresses the conveyor belt between the partitions 187. The top edges of the partitions are beneath the roller 300 and stop downward movement of the gripper jaw 301 carrying the gripper roll 302 so that the roll is separated from the upper face of the gripper as the latter passes below the rear edge of the sheet (Fig. 41). Specifically the arm 303 for the roller 300 is swung about its axis 304 to tension the spring 305 to swing gripper arm or jaw 301 in clockwise direction. Shortly thereafter, the gripper toe is lifted by a rise in the cam slots 182 so that the wrapper edge is clamped (Fig. 42). The slide is moved in reverse direction from the position shown in Fig. 2 and as the toe is again pushed downwardly it separates from roll 302, to leave the wrapper in the position of Fig. 43 with its edge at the point A for which the wrapper is centered below plunger 43.

In the assembly as thus far described, only the box bottom and corresponding wrapper panel are in engagement, leaving four loose flaps of paper and four panels of cardboard. To facilitate handling of this unit and without causing interference with any of the subsequent wrapping operations, the side panels of the bent box blank may be pressed flat against the corresponding wrapper panels, generally as shown in Figs. 22 and 29.

With the box and wrapper stationary upon the conveyor at a point beyond the assembling station, a plate or bar 198 is moved downwardly to flatten the box side panels which are already inclined from vertical due to the natural resilience of the cardboard, flat against the conveyor on wrapper panels which are held by suction. The bar 198 is pivotally supported to the end of the arms 199 which are connected by link 200 and which are operated by cam 201 through bell crank lever 202 and the link 203 constructed to limit the maximum pressure available for flattening the blank. Specifically, the link 203 consists of the plunger 204 engaging a spring 205 within the tubular member 206 with a pin and slot connection between the plunger 204 and member 206. After the plate 198 has flattened the side panels, any further upward movement of plunger 204 is effective only to compress the spring 205.

Assuming the wrapping machine to be hand fed, the operator need only hold the end panels of the blank against the form block of the wrapping machine. Of course, a wrapping machine of the type shown in applications Serial No. 490,400 and Serial No. 611,995 with a feed slide, can also be used, and the flattening of the box side panels, as described, facilitates transfer of the assembly to the feeding position.

In Fig. 30, the same bender unit with the mechanism for flattening the blank side panels is shown as a unit of a system for making multi-piece boxes. In view of the foregoing explanation it is believed that from the drawing itself it is clear that there is no significant change in the mechanism itself. In this figure, however, the assemblies delivered by the conveyor C consist of a wrapper and a box blank comprising only the bottom and side panels. Therefore, all the panels of the blank itself are brought into adhesive engagement with the wrapper prior to any handling by the operator. The assemblies as delivered to the operator are transferred to a machine suitable for forming and wrapping three-piece boxes such as for example, the wrapping machine of the aforesaid applications Serial Nos. 490,400 and 611,995.

The bending machine may also be provided with an arrangement for erecting the ends and one side of the box and for applying part of the wrapper to hold these panels in position so that the assemblies delivered to the operator are in the state of completion shown most clearly in Fig. 34. The mechanism for effecting the necessary operations is shown in Figs. 35 to 39. As the assembly approaches the end of the conveyor, the end panels E of the blank are gradually brought to vertical position by the guides 207, Fig. 36. The stops 208 engage the forward edges of the vertical ends and arrest the assembly which has now passed beyond the suction zone of the conveyor, the distance through which the assembly moves to this position is somewhat less than the step of the conveyor, the belt slipping under the assembly for the last part of its step to insure that the blank is in a registered position against the stops.

During the next period for which the conveyor is stationary, the plates 209 swing inwardly to clamp the box ends against the guide plates 207 and concurrently with inward movement of the clamping plates 209, the stops 208 swing upwardly (to avoid multiplicity of figures, the left and right hand halves of Figs. 35 and 36 show these parts in different operating positions). Each of the clamping plates 209 is carried by one arm of a bell crank lever 210 whose other end is connected by link 211 to an arm 212 secured to the operating shaft of stop 208. The bell crank lever 210 is mounted upon a shaft carrying a beveled gear 213 meshing with a gear 214 keyed to rock shaft 215, which is connected by link 216 to bell crank lever 217 which carries the cam follower 218 engaging the groove 219 of cam 220. When the blank is stopped in the position above stated, the leading side panel and attached wrapper panel rest upon the plates 221 which are carried by the adjustable heads 222 which in turn are supported by the cranks 223.

After the box ends are clamped by the plates 209, the crank 223 is swung to bring the plates 221 to vertical position which moves the leading box panel and attached wrapper panel to vertical position against the leading edges of the box ends. This movement of the cranks is effected by the cam groove 224 of cam 220 through the arm 225 and attached gear segment 226 which engages the gear 227 secured to the shaft 228 to which one of the cranks 223 is secured.

When the heads are in this position the brushes 229 which are carried by the heads are moved inwardly to brush the side flaps f of the leading wrapper side panel into adhesive engagement with the box ends. To effect this movement the brushes 229 are mounted on slides 230 of the heads 222. The gear sector 231 operated by arm 232 carrying a follower engaging the groove 233 of cam 220 meshes with gear 234 which drives the pinion 235 through attached gear 236. This pinion is secured to the end of shaft 237 to which is secured the arm 238 connected to the slide 230.

The side panels and end panels are now in vertical position and held by the side flaps of the wrapper. The heads 222 are now returned to their original position and the assembly released so that upon the next operation of the conveyor the assembly or partially formed box is pushed out on to the plates 221 which are now again horizontal so that the operator may remove it and place it upon the feed slide of a wrapping machine of the type shown in application Serial No. 490,400, or Serial No. 611,995, or directly upon the form block of a wrapping machine such as shown by Letters Patent No. 1,541,036.

When the bender BB, for any of the above described systems is supplied with blanks from a blank-forming machine such as described and claimed in the aforesaid Stokes and Rider application, Serial No. 655,194, the blank-forming machine is synchronized therewith. For example, the tripping cable 240, Fig. 23, for the blank-forming machine is actuated once per cycle of operation of the bender. The tripping cam 241 which rocks the pivoted arm 242 to which cable 240 is attached is adjustably secured to shaft 243 which is driven by chain 244 and bevel gears 245, 246 from shaft 247.

For brevity in the appended claims, the term "overbending" shall be construed to mean bending adjacent box blank panels so that they are almost face to face, i. e., bent so sharply that the fibres at the line of joinder of the panels are fractured or weakened to preclude possibility of bowing of finished box; and the term "scoring" is utilized generically to comprehend scoring, creasing and the like.

What we claim is:

1. Box blank bending mechanism comprising a plunger, a conveyor, means for delivering blanks in succession to said plunger for transfer to said conveyor, and means movable transversely of the path of the plunger for bending the blanks over the edges of the plunger while engaged by said plunger.

2. Box blank bending mechanism comprising a suction plunger, a conveyor, means for delivering blanks in succession to said plunger and held thereon by suction, means movable transversely of the path of the plunger for bending the blanks while supported by said plunger, and means for thereafter releasing the suction upon transfer of the blank by said plunger to said conveyor.

3. Box blank bending mechanism comprising a suction plunger, a conveyor, a suction member for transferring box blanks to said plunger, and means for discontinuing the suction of said member and effecting suction of said plunger upon delivery of a blank by said member to said plunger.

4. A box-forming system comprising a plunger, a conveyor for transporting wrappers, means for delivering box blanks to said plunger for transfer thereby into registered engagement with wrappers on said conveyor, and means for bending the blanks while engaged by said plunger over the edges thereof.

5. A box forming system comprising a plunger, a conveyor for transporting wrappers, suction means for flattening wrappers during transport by said conveyor, means for delivering box blanks to said plunger for transfer thereby into registered engagement with wrappers flattened by suction, and means movable transversely of the path of said plunger for bending the blanks while engaged by said plunger.

6. A box forming system comprising a plunger, means for delivering box blanks to said plunger, structure movable toward and away from said plunger to bend a blank engaged thereby over the edges thereof, and a conveyor for receiving the bent blanks from said plunger.

7. A box forming system comprising a plunger, means for delivering box blanks to said plunger, structure movable toward and away from said plunger to bend a blank engaged thereby, and means for conveying wrappers in registered position to receive in succession from said plunger, bent box blanks.

8. A box forming system comprising a plunger, means for delivering box blanks to said plunger, means movable transversely of the path of said plunger for simultaneously bending opposite sides of each blank over the edges of the plunger while engaged by said plunger, and a conveyor for receiving the bent blanks.

9. A box forming system comprising a plunger, means for delivering one-piece box blanks to said plunger, and means for simultaneously bending a pair of opposite sides of each blank while engaged by said plunger, and for thereafter simultaneously bending the other opposite sides.

10. Box blank bending mechanism comprising means for lifting box blanks in succession from a stack, a plunger having means to hold a box blank thereto, means movable from a position below a lifted box blank to a position below said plunger for transferring said box blanks to said plunger, means for bending the blanks while held by said plunger, and mechanism for moving said transfer means away from said plunger before operation of said bending means.

11. Box blank bending mechanism comprising a plunger for supporting a box blank, structure engaged by the blank upon movement of the plunger to effect partial bending of the blank, and means for moving said structure while the plunger is stationary to complete bending of the blank thereon.

12. Box blank bending mechanism comprising a plunger for supporting a box blank, elements engaged by opposite panels of the blank upon movement of the plunger to effect partial bending of the blank, and means for moving said elements toward each other while the plunger is stationary to complete bending of the blank thereon.

13. A box forming system comprising a plunger, means for delivering box blanks to said plunger, means for bending blanks engaged by said plunger, a conveyor for transporting wrappers to a station for receiving bent blanks from said plunger, and means at said station for accurately registering the wrappers before the boxes are brought into engagement therewith by said plunger.

14. A box forming system comprising a plunger, conveyor system for transporting wrappers, means for delivering a box blank to said plunger for transfer thereof to registered engagement with a wrapper upon said conveyor system, and means for flattening a side panel of the blank upon the corresponding panel of the wrapper while upon said conveyor system.

15. A box forming system comprising a plunger, a conveyor system for transporting wrappers, means for delivering a box blank to said plunger for transfer thereof into registered engagement with a wrapper upon said conveyor system, means for bending the blank while engaged by said plunger, and mechanism for flattening an upstanding panel of the blank upon a corresponding portion of the wrapper while upon said conveyor system.

16. A box forming system comprising a plunger, a suction conveyor for transporting wrappers, means for delivering a box blank to said plunger for transfer thereof into registered engagement with a wrapper upon said conveyor, means for bending the blank while engaged by said plunger, and mechanism for flattening an upstanding panel of the blank upon a portion of the wrapper flattened by suction on said conveyor.

17. A box forming system comprising a conveyor for transporting wrappers, means for registering box blanks on said wrappers while on said conveyor, and means for bending up one or more of the panels of each blank and wrapper structure adhering thereto while the blank and attached wrapper is on said conveyor.

18. A box forming system comprising a conveyor for transporting wrappers toward a box-wrapping machine, means for registering box blanks on said wrappers while on said conveyor, means in advance of said box-wrapping machine for bending one side panel and adjacent end panels of the blank, and means in advance of said box-wrapping machine for folding the corner laps of the wrapper panel attached to said side panel of the blank into engagement with said end panels of the blank.

19. A box forming system comprising a conveyor for transporting wrappers, means for registering a bent blank upon a wrapper while on said conveyor, means for flattening side panels of the wrapper while upon said conveyor, means for bending up the end panels of the blank and one of said side panels of the blank with adhering wrapper panel, and means for folding extensions of said wrapper panel into engagement with said end panels, while said blank and wrapper are upon said conveyor.

20. In a box forming system, a plunger, a swinging arm adapted to receive a box blank and deliver it to said plunger, crank mechanism for operating said arm and a link between said crank mechanism and said arm, the axis of rotation of said crank mechanism and the pivotal axes of said link being on dead-center at the blank receiving and blank delivering positions of said arm.

21. In a box forming system, a conveyor operating intermittently to transport wrappers, means for depositing a box blank upon a wrapper supported by said conveyor while said conveyor is at rest, and mechanism operating in timed relation to said means for registering the wrapper immediately prior to application of said blank thereto.

22. In a box forming system, a conveyor operating intermittently to transport wrappers, means for depositing a box blank upon a wrapper supported by said conveyor while said conveyor is at rest, and means for engaging an edge of each wrapper and moving the wrapper to a predetermined position for reception of the box blank.

23. In a box forming system, a conveyor operating intermittently to transport wrappers, means for depositing a box blank upon a wrapper supported by said conveyor and while said conveyor is at rest, and means operating in timed relation to said depositing means for engaging the trailing edge of each wrapper and moving it to a predetermined position for reception of the box blank.

24. In a box forming system, a suction conveyor operating intermittently to transport wrappers, means for depositing a box blank upon a wrapper supported by said conveyor while said conveyor is at rest, mechanism operating in timed relation to said means for registering the wrapper immediately prior to application of said blank thereto, and means for effecting substantial reduction of suction during said registration of the wrapper.

25. In a box system, a conveyor for feeding wrappers toward and beyond a station at which a box blank is deposited thereon, means for effecting intermittent movement of said conveyor, and structure normally out of the path of movement of said wrapper operated, while said conveyor is at rest to engage a wrapper at said station and move it to registered position for reception of a box blank.

26. In a box system, a suction conveyor for feeding wrappers toward and beyond a station at which a box blank is deposited thereon, means for effecting intermittent movement of said conveyor, structure normally out of the path of movement of said wrapper operated, while said conveyor is at rest to engage a wrapper at said station and move it to registered position for reception of a box blank, and means effecting substantial reduction of suction on said wrapper during said registration thereof by said structure.

27. In a box forming system, a conveyor for transporting assemblies each comprising a box blank and adhering wrapper, means for moving end panels of the blank to upright position while said assemblies are on said conveyor, means for moving the leading side panel of each blank and adhering wrapper panel to upright position while the assembly is on said conveyor, and means for effecting adhesive engagement between flaps of said wrapper panel and said upright end panels while said assembly is on said conveyor.

28. A box forming system comprising a movable structure, means for delivering box blanks thereto, means for bending a panel of a blank while upon said movable structure, a conveyor system for transporting gummed wrappers, said movable structure transferring a box blank after aforesaid bending of a panel to a wrapper to effect adhesive register of a box component with the wrapper, and means thereafter bringing at least one panel of the blank into adhesive engagement with the wrapper while upon said conveyor system to effect further but incomplete wrapping of the box component.

29. Means for bending a box blank comprising means for moving a blank to a predetermined position, structure movable into the path of said means for supporting said blank, means for bending panels of said blank while supported by said structure, and means for withdrawing said supporting structure to allow movement of the bent blank by said first means.

30. In a box forming system, means for locating a wrapper in a predetermined position, means for engaging and transferring a box blank into engagement with the wrapper, and means for moving the blank while engaged by said means to ensure registration of the blank as applied to the wrapper in said position.

31. In a box forming system, means for locating a wrapper in a predetermined position, a plunger for engaging and transferring a box blank into engagement with the wrapper, and structure movable toward and away from the path of said plunger for moving the blank engaged thereby to a position ensuring its registration with the wrapper.

32. In a box forming system, a conveyor belt for transporting wrappers, a support for said belt having a depressed section, and means for depressing the belt into said section to engage a wrapper edge over said section.

33. In a box forming system, a conveyor belt for transporting wrappers, a support for said belt having a depressed section, and gripper means movable toward and away from the belt adapted to depress the belt into said section and to engage a wrapper edge over said section.

34. A box forming system comprising a conveyor for transporting wrappers, means for registering box blanks on said wrappers while on said conveyor, and means for bending up one or more panels of each blank after registration with a wrapper and while the blank and wrapper assembly is on said conveyor.

35. A box forming system comprising a wrapper for transporting wrappers toward a box-wrapping machine, means for registering box blanks on said wrappers while on said conveyor, and means in advance of said wrapping machine for bending up one side panel and the end panels of each blank after registration with a wrapper and while the blank and wrapper assembly is on said conveyor.

36. A box forming system comprising a conveyor for transporting box blanks toward box forming mechanism, and means in advance of said mechanism for bending up one or more panels of each blank while on said conveyor.

37. A box forming system comprising a conveyor for transporting box blanks toward box forming mechanism, and means in advance of said mechanism for bending up one side panel and both end panels of each blank while on said conveyor.

38. In a box forming system, a conveyor for transporting assemblies each comprising a box blank and partially applied sheet material toward a box forming station, and means in advance of said mechanism for bending up one or more panels of each blank while the assembly including it is on said conveyor.

39. In a box forming system, a conveyor for transporting assemblies each comprising a box blank and partially applied sheet material toward a box forming station, and means in advance of said mechanism for bending up a side panel and both end panels of each blank while the assembly including it is on said conveyor.

40. A box-forming system comprising a plunger having means for holding a box blank thereto, and means for bending the blank while on said plunger comprising structure movable toward and away from said plunger, said movable structure having an extension surface for engaging the bottom panel of the blank adjacent an edge thereof, and a surface for engaging and erecting a side or end panel of the blank and co-operating with said extension surface of said movable structure to form a narrow slot which embraces the corner formed by the common edge of said panels sharply to bend said side or end panel while said extension surface of said movable structure engages and supports said bottom panel.

41. A box-forming system comprising a plunger having means for holding a box blank thereto, means for bending the blank while on said plunger comprising reciprocating structures movable toward and away from said plunger, one of said movable structures having an extension surface for engaging and supporting the bottom panel of the blank and a surface co-operating therewith to form a narrow groove for embracing the common edge of a side panel and said bottom panel thereby sharply to bend said side panel while said extension surface supports the bottom panel, and another of said movable structures having an extension surface for engaging and supporting the bottom panel of the blank and a surface co-operating therewith to form a narrow groove for embracing the common edge of an end panel and said bottom panel thereby sharply to bend said end panel while said extension surface supports the bottom panel, and means for moving said structures in succession toward and away from said plunger.

42. A box-forming system comprising a plunger having means for holding a box blank thereto, means for bending the blank while on said plunger comprising two pairs of reciprocating structures movable toward and away from said plunger, each of one of said pairs having an extension surface for engaging and supporting the bottom panel of the blank and a surface co-operating therewith to form a narrow groove for embracing the common edge of a side panel and said bottom panel thereby sharply to bend said side panel while said extension surface engages and supports the bottom panel, each of the structures of the other pair having an extension surface for engaging the bottom panel of the blank and a surface co-operating therewith to form a narrow groove for embracing the common edge of an end panel and said bottom panel thereby sharply to bend said end panel while the extension surface supports the bottom panel, and means for moving one of said pairs of structures toward and away from the plunger and then the other of said pairs toward and away from said plunger.

43. A box-forming system comprising a plunger having means for holding a box blank thereto and comprising plate structure whose outline substantially corresponds to the bottom panel of said blank, mechanism for moving said plunger along a path and for stopping said plunger at an intermediate portion of said path, and means operative, while said plunger is at rest at said intermediate portion of its travel, to bend panels of said blank over respective edges of said plate structure comprising slotted reciprocating structures, part of whose movement erects said panels and whose further movement causes the slots to embrace edges of said plate structure thereby bending the panels thereover.

44. In a box-forming system, a conveyor belt for transporting wrappers, a support for said belt having a depressed section, and reciprocating means adapted to depress the belt into said section and comprising a gripper adapted to engage a wrapper edge over said section.

45. Mechanism comprising a plunger for holding a box blank, structure movable toward and away from said plunger adapted to support the bottom panel of the blank while held by said plunger, and structure movable toward and away from said plunger adapted to engage and bend a panel of the blank adjacent to said bottom panel while said bottom panel is engaged by said first movable structure.

46. Mechanism comprising a plunger for transferring a box structure, and structure movable toward and away from said plunger for engaging the box structure while held thereto and moving it to aligned position thereon.

47. Mechanism comprising a plunger for holding a box blank, structure movable toward and away from said plunger adapted to support the bottom panel of the blank while held by said plunger, structure movable toward and away from said plunger adapted to engage and bend a panel of the blank adjacent to said bottom panel while said bottom panel is engaged by said first movable structure, and structure movable toward and away from said plunger for engaging the blank on said plunger and moving it to aligned position thereon.

48. Mechanism comprising a plunger for transferring a box blank, means comprising structure movable toward and away from said plunger for bending the blank thereon, and means comprising structure movable toward and away from said plunger for aligning the box blank thereon.

49. A system comprising a conveyor for transporting wrappers, a plunger for transferring box structures to said wrappers, means for aligning each of the box structures on said plunger before contact with a wrapper, and means for aligning each of the wrappers on said conveyor before engagement by one of said box structures.

50. A system comprising a conveyor for transporting wrappers, a plunger for transferring box blanks to said wrappers, means for bending each of the box blanks on said plunger and aligning it before contact with a wrapper, and means for aligning each of the wrappers on said conveyor before engagement by one of said box blanks.

51. A system comprising a conveyor belt for transporting wrappers, a support for said belt having a depressed section, and wrapper-aligning structure adapted to enter said depressed section below the edge of a wrapper thereover.

52. A system comprising a conveyor belt for transporting wrappers, a support for said belt having a depressed section, and structure adapted to enter said depressed section below the edge of a wrapper on said conveyor.

JOHN S. STOKES.
ERNEST G. RIDER.